(12) United States Patent
Furuta

(10) Patent No.: US 11,733,396 B2
(45) Date of Patent: Aug. 22, 2023

(54) POSITION ESTIMATION DEVICE AND POSITION ESTIMATION METHOD

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/336,764

(22) Filed: Jun. 2, 2021

(65) Prior Publication Data

US 2021/0382185 A1 Dec. 9, 2021

(30) Foreign Application Priority Data

Jun. 5, 2020 (JP) ................. 2020-098367

(51) Int. Cl.
| | | |
|---|---|---|
| *G01S 19/45* | (2010.01) | |
| *B60C 23/02* | (2006.01) | |
| *B60C 23/20* | (2006.01) | |

(52) U.S. Cl.
CPC .............. *G01S 19/45* (2013.01); *B60C 23/02* (2013.01); *B60C 23/20* (2013.01)

(58) Field of Classification Search
CPC ..... G05D 2201/02; G05D 1/021; G05D 1/101
See application file for complete search history.

(56) References Cited

U.S. PATENT DOCUMENTS

| 4,825,368 A * | 4/1989 | Itoh .................... B60K 23/0808 |
| | | 701/69 |
| 2002/0099481 A1 | 7/2002 | Mori |
| 2010/0060443 A1 * | 3/2010 | Wakao .................. B60C 99/006 |
| | | 73/1.37 |
| 2010/0324780 A1 | 12/2010 | Koumura et al. |
| 2011/0066376 A1 | 3/2011 | Takaoka |
| 2018/0003593 A1 * | 1/2018 | Siegel ................... B60C 11/246 |
| 2019/0274016 A1 | 9/2019 | Kuraoka |
| 2020/0298635 A1 * | 9/2020 | Suzuki ............... B60C 23/0488 |

FOREIGN PATENT DOCUMENTS

| JP | H0566713 A | 3/1993 |
| JP | H07306056 A | 11/1995 |
| JP | 2002215236 A | 7/2002 |
| JP | 2004-237947 A | 8/2004 |
| JP | 2008-143460 A | 6/2008 |
| JP | 2009-096366 A | 5/2009 |
| JP | 2011059065 A | 3/2011 |
| JP | 2016-107778 A | 6/2016 |
| JP | 2016218015 A | 12/2016 |
| JP | 2017226270 A | 12/2017 |
| JP | 2018101346 A | 6/2018 |
| JP | 2020-16541 A | 1/2020 |

* cited by examiner

*Primary Examiner* — Nicholas Kiswanto
*Assistant Examiner* — Christopher A Buksa
(74) *Attorney, Agent, or Firm* — Dinsmore & Shohl LLP

(57) ABSTRACT

A position estimation device includes an ECU. The ECU is configured to estimate the position of a vehicle using at least a traveled distance of the vehicle. The ECU calculates correction factors for a reference tire rolling radius and stores the correction factors in a storage device. Each of the correction factors is set for a corresponding one of a plurality of vehicle speed ranges. The ECU calculates the traveled distance of the vehicle based on a rotation parameter and the corrected reference tire rolling radius obtained by correcting the reference tire rolling radius using the correction factor.

3 Claims, 12 Drawing Sheets

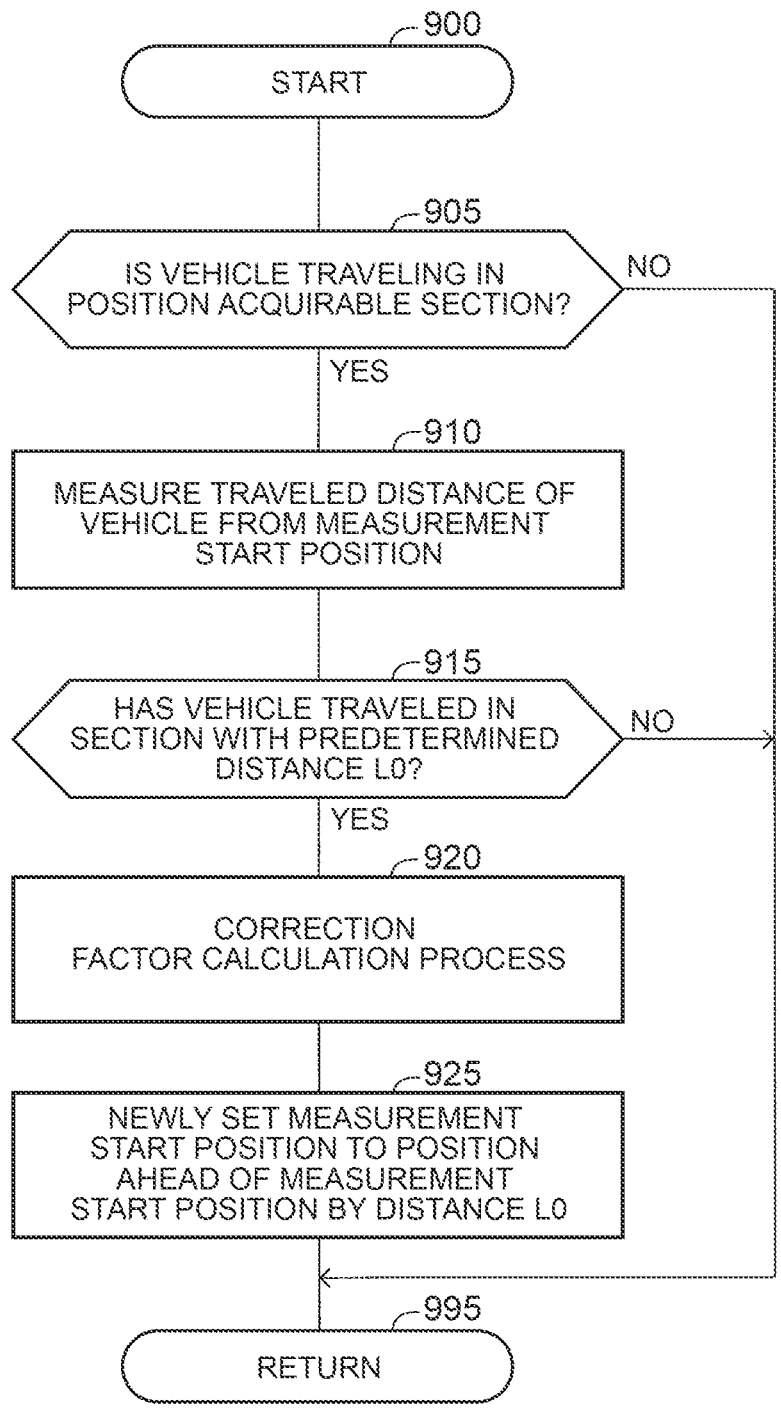

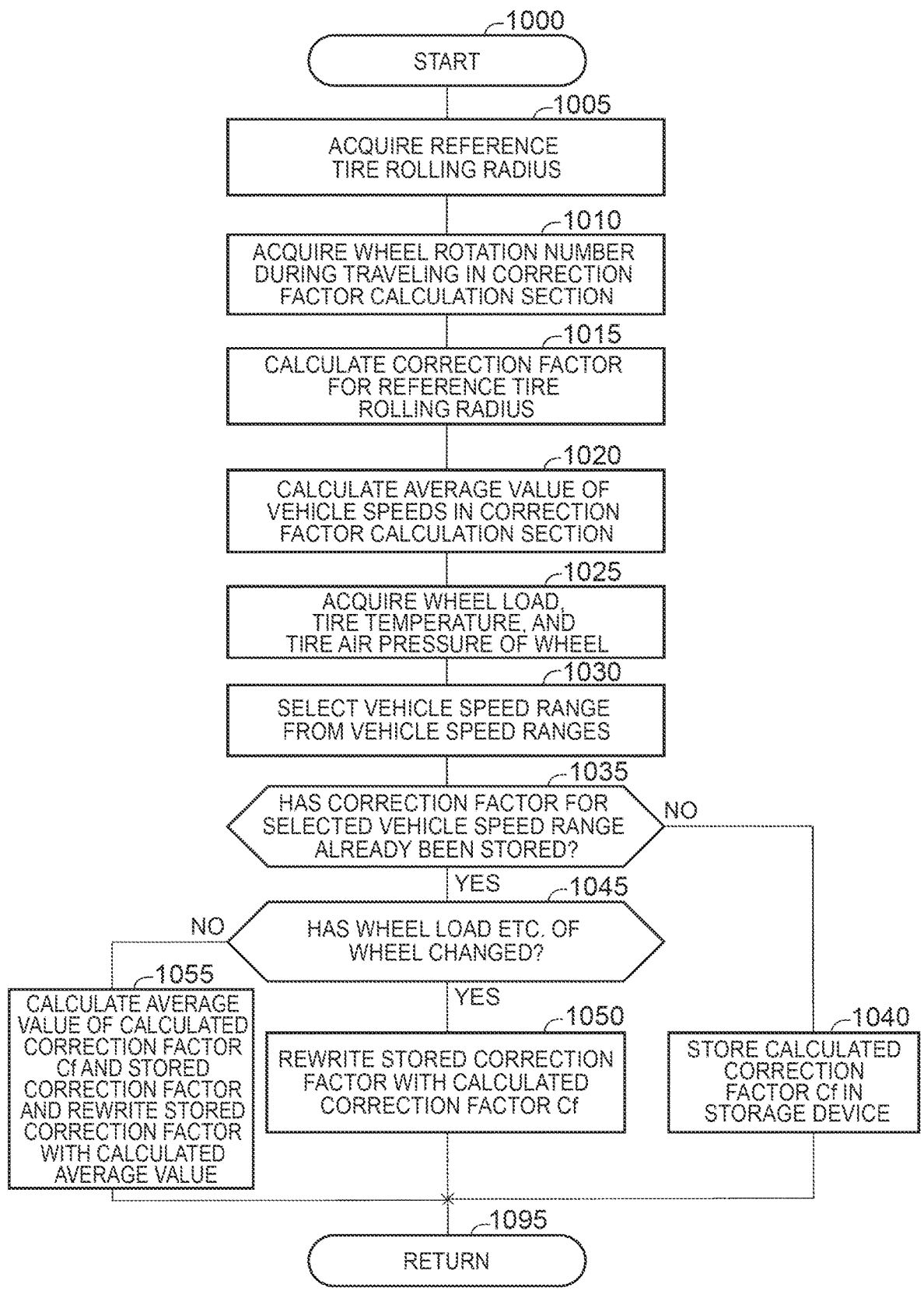

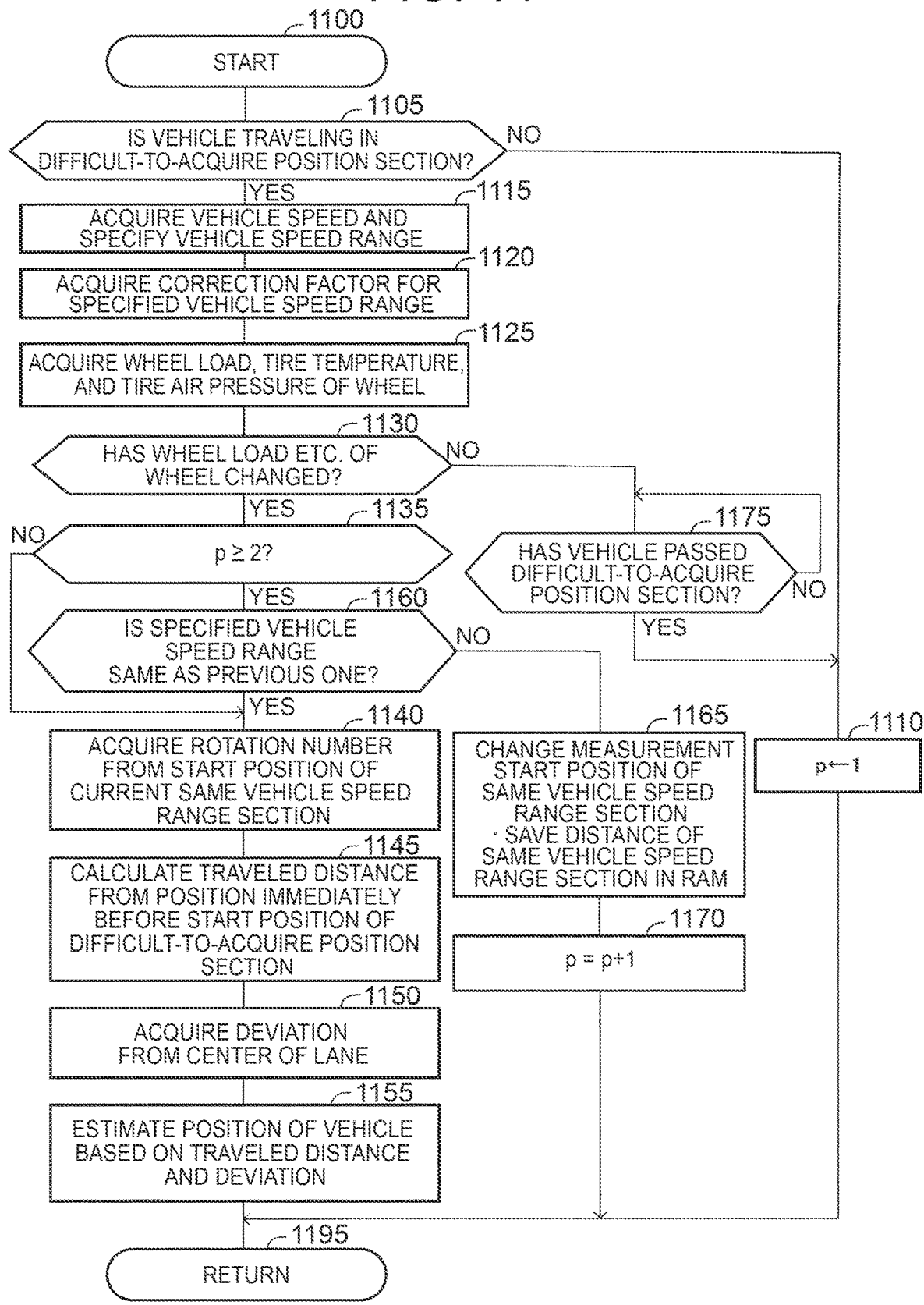

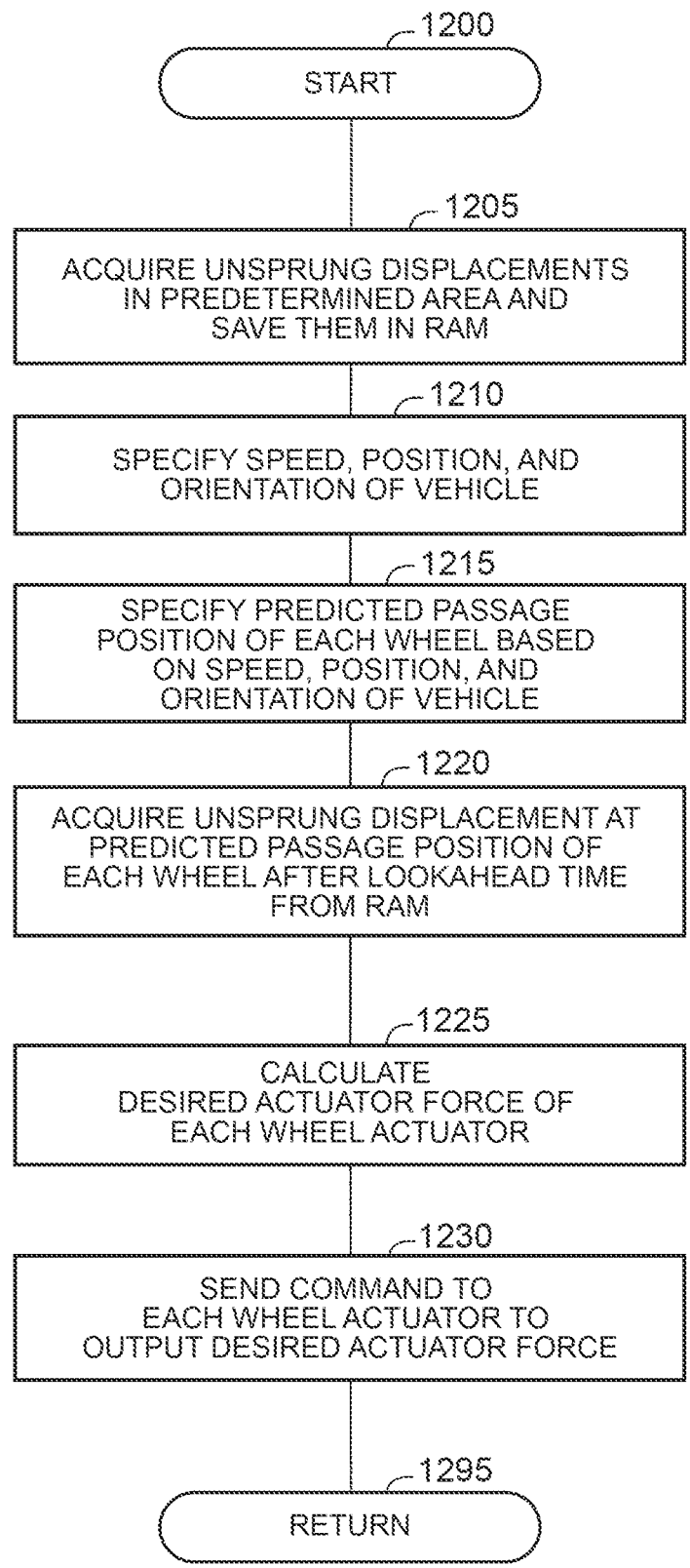

POSITION ESTIMATION DEVICE AND POSITION ESTIMATION METHOD

CROSS-REFERENCE TO RELATED APPLICATION

This application claims priority to Japanese Patent Application No. 2020-098367 filed on Jun. 5, 2020, incorporated herein by reference in its entirety.

BACKGROUND

1. Technical Field

The disclosure relates to position estimation devices and position estimation methods for estimating the position (self-position) of a vehicle.

2. Description of Related Art

The position of a vehicle has conventionally been estimated using the traveled distance of the vehicle. Japanese Unexamined Patent Application Publication No. H07-306056 (JP H07-306056 A) discloses a technique of calculating the traveled distance (hereinafter referred to as the "related art"). In the related art, the direct distance between two points (detected by the Global Positioning System (GPS)) and the square root D of the sum of the squares of orthogonal components of the number of pulses counted between the same two points (detected by a wheel speed sensor and a direction sensor) are calculated only when the detection accuracy of the GPS is satisfactory. In the related art, a pulse distance factor is calculated by "direct distance/square root D." In the related art, the traveled distance of the vehicle is calculated by "pulse distance factor×number of pulses counted by wheel speed sensor."

SUMMARY

The tire rolling radius, which is the radius of a rolling tire of a vehicle, changes according to the vehicle speed. In the case where the traveled distance is measured by "pulse distance factor×number of pulses counted by wheel speed sensor," the number of pulses counted between two points changes according to the vehicle speed because the tire rolling radius changes according to the vehicle speed. Accordingly, the pulse distance factor also changes according to the vehicle speed.

In the related art, however, the pulse distance factor is not calculated according to the vehicle speed. Therefore, in the related art, the accuracy of measurement of the traveled distance of the vehicle may be reduced due to the difference between the vehicle speed used to calculate the pulse distance factor and the vehicle speed used to measure the traveled distance. Accordingly, when the related art is applied to vehicle position estimation using the traveled distance, the accuracy of vehicle position estimation may be reduced.

The disclosure provides a position estimation device and a position estimation method that improve the accuracy of vehicle position estimation.

Hereinafter, the position estimation device of the disclosure is sometimes referred to as the "present position estimation device," and the position estimation device of the present disclosure is sometimes referred to as the "present position estimation method."

A position estimation device according to an aspect of the disclosure includes: a position acquisition device configured to acquire a position of a vehicle; a vehicle information acquisition device configured to acquire a rotation parameter related to rotation of wheels of the vehicle and a vehicle speed of the vehicle; a correction factor storage device configured to store correction factors for a reference tire rolling radius, each of the correction factors being set for a corresponding one of a plurality of vehicle speed ranges; and a control unit configured to estimate the position of the vehicle using a traveled distance of the vehicle when the position acquisition device is not able to acquire the position of the vehicle. The control unit is configured to, when the position acquisition device is able to acquire the position of the vehicle and the control unit determines based on the acquired position of the vehicle that the vehicle has traveled in a correction factor calculation section with a reference distance, calculate a comparative distance based on the rotation parameter during traveling of the vehicle in the correction factor calculation section, and the reference tire rolling radius, calculate a correction factor for the reference tire rolling radius based on the reference distance and the calculated comparative distance, select, from among the plurality of vehicle speed ranges, a vehicle speed range that corresponds to the vehicle speed of the vehicle during traveling of the vehicle in the correction factor calculation section, and store the calculated correction factor in association with the selected vehicle speed range in the correction factor storage device. The control unit is configured to, when estimating the position of the vehicle using the traveled distance of the vehicle, specify, from among the plurality of vehicle speed ranges, a vehicle speed range that includes the vehicle speed of the vehicle, correct the reference tire rolling radius using the correction factor stored in association with the specified vehicle speed range in the correction factor storage device, and calculate the traveled distance of the vehicle based on the rotation parameter and the corrected reference tire rolling radius.

According to the present position estimation device, the traveled distance of the vehicle is calculated based on an accurate tire rolling radius corrected by the correction factors for the reference tire rolling radius. Each of the correction factors is calculated for a corresponding one of the vehicle speed ranges. The present position estimation device thus improves the accuracy of vehicle position estimation.

In the position estimation device of the above aspect, the vehicle information acquisition device may be configured to further acquire a wheel load, a tire temperature, and a tire air pressure of the wheels. The control unit may be configured to store the wheel load, the tire temperature, and the tire air pressure acquired during traveling of the vehicle in the correction factor calculation section in association with the calculated correction factor in the correction factor storage device. The control unit may be configured to, when following conditions i) and ii) are both satisfied, i) the correction factor associated with the same vehicle speed range as the vehicle speed range to be associated with the calculated correction factor has already been stored in the correction factor storage device, and ii) at least one of the wheel load, the tire temperature, and the tire air pressure to be associated with the calculated correction factor has changed by a predetermined threshold or more from the at least one of the wheel load, the tire temperature, and the tire air pressure associated with the correction factor that has already been stored in the correction factor storage device, rewrite the correction factor that has already been stored in the correction factor storage device with the calculated correction factor.

According to the above aspect, the traveled distance of the vehicle is calculated based on the corrected reference tire rolling radius corrected by the correction factors for the reference tire rolling radius. Each of the correction factors is calculated for a corresponding one of the vehicle speed ranges and according to the wheel load, the tire temperature, and the tire air pressure of the wheels. The above aspect thus improves the accuracy of vehicle position estimation.

In the position estimation device of the above aspect, the control unit may be configured to, when estimating the position of the vehicle using the traveled distance of the vehicle, specify as a reference position a position that is ahead of a specific position of the vehicle acquired when the position acquisition device was able to acquire the position of the vehicle by the calculated traveled distance of the vehicle, acquire a deviation in a lateral direction of a lane from the specified reference position, and estimate the position of the vehicle based on the specified reference position and the acquired deviation.

The above aspect improves the accuracy of estimation of the vehicle position in the lateral direction of the lane.

In the position estimation device of the above aspect, the control unit may be configured in such a manner that, when the position acquisition device is able to acquire the position of the vehicle, the acquired position of the vehicle is used for preview damping control, and when the position acquisition device is not able to acquire the position of the vehicle, the estimated position of the vehicle is used for the preview damping control. The preview damping control may be control in which, based on the acquired position of the vehicle or the estimated position of the vehicle, road surface displacement-related information is acquired from a storage device located inside or outside of the vehicle and storing the road surface displacement-related information, and vibration of a sprung portion of the vehicle is damped by causing a control force generation device included in the vehicle to generate a control force specified based on the acquired road surface displacement-related information at a position of at least one of the wheels and in a vehicle body portion corresponding to the position of the one of the wheels at a timing front wheels actually pass predicted passage positions, the road surface displacement-related information being information related to a vertical displacement of a road surface at the predicted passage positions, the predicted passage positions being positions at which the front wheels included in the wheels are predicted to pass, and the control force being a control force for damping the vibration of the sprung portion.

In the above aspect, the position of the vehicle to be used for the preview damping control is accurately estimated (an accurate position of the vehicle is acquired) even when the position acquisition device is not able to acquire the position of the vehicle.

Another aspect of the disclosure provides a position estimation method. This position estimation method includes: acquiring a position of a vehicle; acquiring a rotation parameter related to rotation of wheels of the vehicle and a vehicle speed of the vehicle; and estimating the position of the vehicle using a traveled distance of the vehicle when the position of the vehicle is not able to be acquired. When the position of the vehicle is able to be acquired and determination is made based on the acquired position of the vehicle that the vehicle has traveled in a correction factor calculation section with a reference distance, a comparative distance is calculated based on the rotation parameter during traveling of the vehicle in the correction factor calculation section, and a reference tire rolling radius, a correction factor for the reference tire rolling radius is calculated based on the reference distance and the calculated comparative distance, a vehicle speed range that corresponds to the vehicle speed of the vehicle during traveling of the vehicle in the correction factor calculation section is selected from among a plurality of vehicle speed ranges, and the calculated correction factor is stored in association with the selected vehicle speed range in a correction factor storage device. When estimating the position of the vehicle using the traveled distance of the vehicle, a vehicle speed range that includes the vehicle speed of the vehicle is specified from among the plurality of vehicle speed ranges, the reference tire rolling radius is corrected using the correction factor stored in association with the specified vehicle speed range in the correction factor storage device, and the traveled distance of the vehicle is calculated based on the rotation parameter and the corrected reference tire rolling radius.

According to the present position estimation method, the traveled distance of the vehicle is calculated based on an accurate tire rolling radius corrected by the correction factors for the reference tire rolling radius. Each of the correction factors is calculated for a corresponding one of the vehicle speed ranges. The present position estimation method thus improves the accuracy of vehicle position estimation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is an example of a flowchart of a routine that is executed by a central processing unit (CPU) of an electronic control device;

FIG. 10 is another example of a flowchart of a routine that is executed by the CPU of the electronic control device;

FIG. 11 is still another example of a flowchart of a routine that is executed by the CPU of the electronic control device; and FIG. 12 is a further example of a flowchart of a routine that is executed by the CPU of the electronic control device.

DETAILED DESCRIPTION OF EMBODIMENTS

Configuration

A position estimation device according to an embodiment of the disclosure will be described with reference to the accompanying drawings. The position estimation device is incorporated in a vehicle preview damping control device 20 (hereinafter referred to as the "damping control device 20") of FIG. 2 that is applied to a vehicle 10 of FIG. 1.

Figure 1:
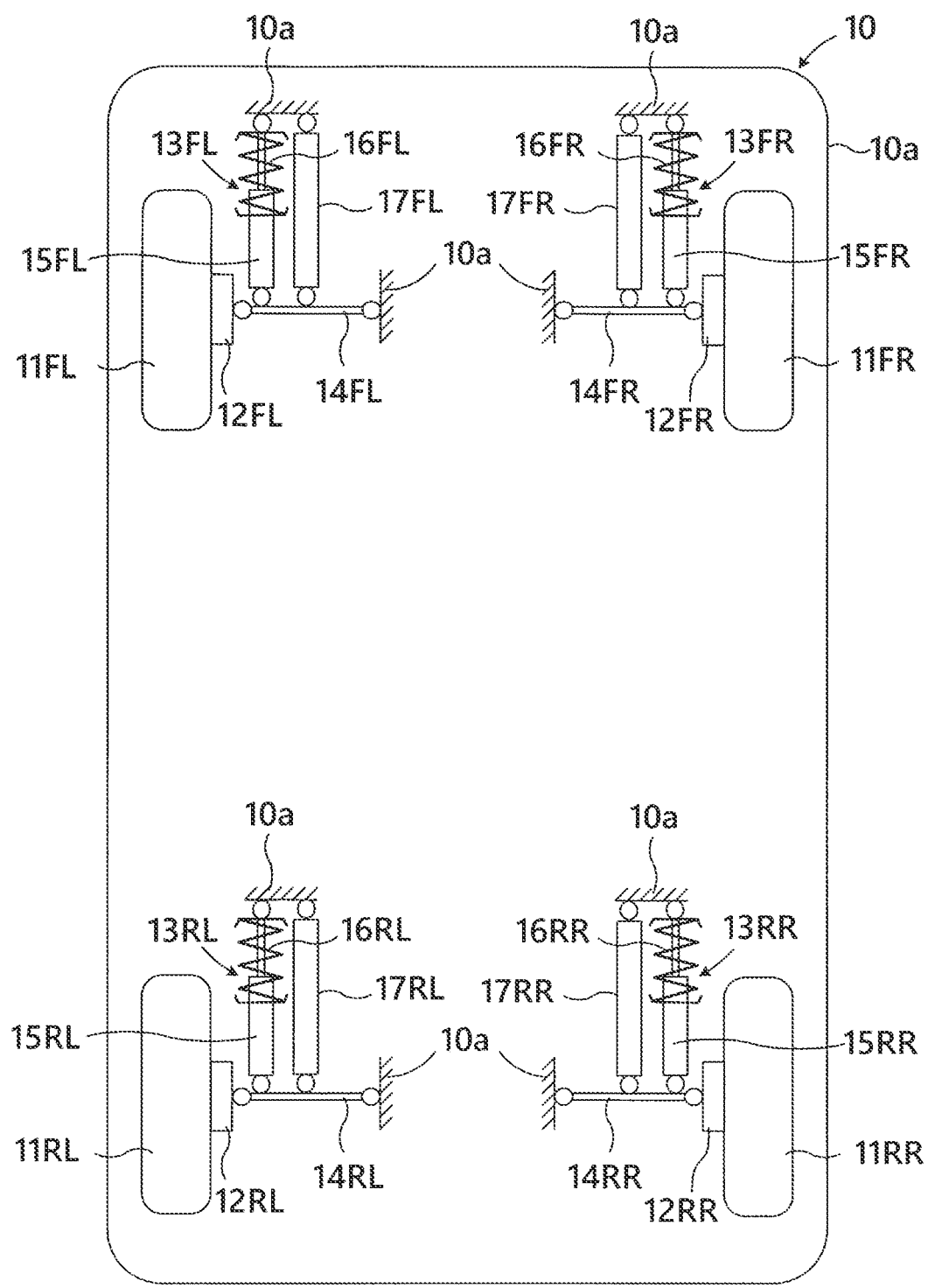
FIG. 1 is a schematic configuration diagram of a vehicle to which a preview damping control device is applied.

As shown in FIG. 1, the vehicle 10 includes a left front wheel 11FL, a right front wheel 11FR, a left rear wheel 11RL, and a right rear wheel 11RR. The left front wheel 11FL is rotatably supported by a wheel support member 12FL. The right front wheel 11FR is rotatably supported by a wheel support member 12FR. The left rear wheel 11RL is rotatably supported by a wheel support member 12RL. The right rear wheel 11RR is rotatably supported by a wheel support member 12RR.

The left front wheel 11FL, the right front wheel 11FR, the left rear wheel 11RL, and the right rear wheel 11RR are sometimes referred to as the "wheels 11FL to 11RR." The left front wheel 11FL, the right front wheel 11FR, the left rear wheel 11RL, and the right rear wheel 11RR are referred to as the "wheels 11" unless individually identified. Similarly, the left front wheel 11FL and the right front wheel 11FR are referred to as the "front wheels 11F," and the left rear wheel 11RL and the right rear wheel 11RR are referred to as the "rear wheels 11R" unless individually identified. The wheel support members 12FL to 12RR are referred to as the "wheel support members 12" unless individually identified.

The vehicle 10 further includes a left front wheel suspension 13FL, a right front wheel suspension 13FR, a left rear wheel suspension 13RL, and a right rear wheel suspension 13RR.

The left front wheel suspension 13FL suspends the left front wheel 11FL from the vehicle body 10a, and includes a suspension arm 14FL, a shock absorber 15FL, and a suspension spring 16FL. The right front wheel suspension 13FR suspends the right front wheel 11FR from a vehicle body 10a, and includes a suspension arm 14FR, a shock absorber 15FR, and a suspension spring 16FR.

The left rear wheel suspension 13RL suspends the left rear wheel 11RL from the vehicle body 10a, and includes a suspension arm 14RL, a shock absorber 15RL, and a suspension spring 16RL. The right rear wheel suspension 13RR suspends the right rear wheel 11RR from the vehicle body 10a, and includes a suspension arm 14RR, a shock absorber 15RR, and a suspension spring 16RR.

The left front wheel suspension 13FL, the right front wheel suspension 13FR, the left rear wheel suspension 13RL, and the right rear wheel suspension 13RR are sometimes referred to as the "suspensions 13FL to 13RR." The left front wheel suspension 13FL, the right front wheel suspension 13FR, the left rear wheel suspension 13RL, and the right rear wheel suspension 13RR are referred to as the "suspensions 13" unless individually identified. Similarly, the suspension arms 14FL to 14RR are referred to as the "suspension arms 14," the shock absorbers 15FL to 15RR are referred to as the "shock absorbers 15," and the suspension springs 16FL to 16RR are referred to as the "suspension springs 16" unless individually identified.

Each suspension arm 14 connects the wheel support member 12 that supports the wheel 11 to the vehicle body 10a. Although only one suspension arm 14 is shown for each suspension 13 in FIG. 1, a plurality of suspension arms 14 may be provided for each suspension 13.

Each shock absorber 15 is disposed between the vehicle body 10a and the suspension arm 14, and is connected at its upper end to the vehicle body 10a and is connected at its lower end to the suspension arm 14. Each suspension spring 16 is elastically disposed between the vehicle body 10a and the suspension arm 14 via the shock absorber 15. That is, the upper end of the suspension spring 16 is connected to the vehicle body 10a, and the lower end of the suspension spring 16 is connected to a cylinder of the shock absorber 15. In the case where the suspension spring 16 is elastically disposed in this manner, the shock absorber 15 may be disposed between the vehicle body 10a and the wheel support member 12.

In this example, the shock absorber 15 is a non-adjustable shock absorber. However, the shock absorber 15 may be an adjustable shock absorber. The shock absorber 15 may be disposed between the vehicle body 10a and the wheel support member 12. The shock absorber 15 and the suspension spring 16 may be disposed between the vehicle body 10a and the wheel support member 12. The suspension spring 16 may be elastically disposed between the vehicle body 10a and the suspension arm 14 without using the shock absorber 15. That is, the upper end of the suspension spring 16 may be connected to the vehicle body 10a, and the lower end of the suspension spring 16 may be connected to the suspension arm 14. In the case where the suspension spring 16 is elastically disposed in this manner, the shock absorber 15 and the suspension spring 16 may be disposed between the vehicle body 10a and the wheel support member 12.

A left front wheel active actuator 17FL, a right front wheel active actuator 17FR, a left rear wheel active actuator 17RL, and a right rear wheel active actuator 17RR are provided between the vehicle body 10a and piston rods of the shock absorbers 15FL to 15RR, respectively. The left front wheel active actuator 17FL, the right front wheel active actuator 17FR, the left rear wheel active actuator 17RL, and the right rear wheel active actuator 17RR are also simply referred to as the "left front wheel actuator 17FL," the "right front wheel actuator 17FR," the "left rear wheel actuator 17RL," and the "right rear wheel actuator 17RR," respectively.

The left front wheel actuator 17FL, the right front wheel actuator 17FR, the left rear wheel actuator 17RL, and the right rear wheel actuator 17RR are sometimes referred to as the "wheel actuators 17FL to 17RR." The left front wheel actuator 17FL, the right front wheel actuator 17FR, the left rear wheel actuator 17RL, and the right rear wheel actuator 17RR are referred to as the "wheel actuators 17" unless individually identified. Similarly, the left front wheel actuator 17FL and the right front wheel actuator 17FR are referred to as the "front wheel actuators 17F," and the left rear wheel actuator 17RL and the right rear wheel actuator 17RR are referred to as the "rear wheel actuators 17R" unless individually identified.

Each wheel actuator 17 is disposed in parallel with the shock absorber 15 and the suspension spring 16. The wheel actuator 17 functions as an actuator that hydraulically or electromagnetically variably generates a force acting between the vehicle body 10a and the wheel 11. The wheel actuator 17 cooperates with the shock absorber 15, the suspension spring 16, etc. to form an active suspension. The wheel actuator 17 may be an actuator with any configuration known in the art as long as the wheel actuator 17 can generate a force acting between the vehicle body 10a and the wheel 11 (hereinafter referred to as the "actuator force") as controlled by an electronic control device 30 (hereinafter referred to as the "ECU 30"). The wheel actuator 17 is also referred to as the "control force generation device" for convenience. The actuator force is also referred to as the "control force" for convenience.

Figure 2:
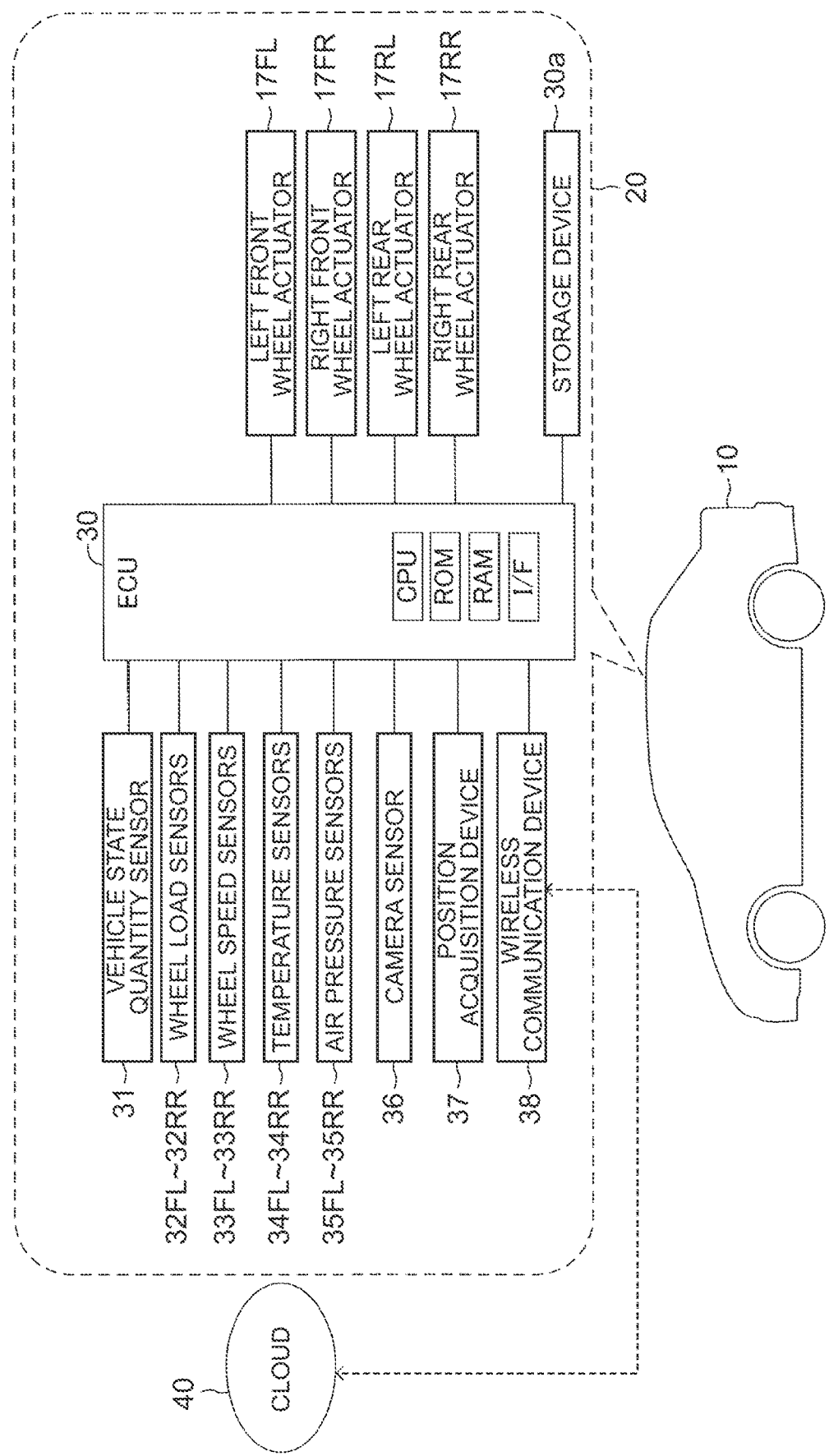
FIG. 2 is a schematic configuration diagram of the preview damping control device.

As shown in FIG. 2, the damping control device 20 includes the ECU 30, a storage device 30a, a vehicle state quantity sensor 31, wheel load sensors 32FL to 32RR, wheel speed sensors 33FL to 33RR, temperature sensors 34FL to 34RR, air pressure sensors 35FL to 35RR, a camera sensor 36, a position acquisition device 37, and a wireless communication device 38. The damping control device 20 further includes the left front wheel actuator 17FL, the right front wheel actuator 17FR, the left rear wheel actuator 17RL, and the right rear wheel actuator 17RR.

The ECU 30 is an electronic control unit including a microcomputer as a main component and is also called a controller. The microcomputer includes a central processing unit (CPU), a read-only memory (ROM), a random access memory (RAM), an interface (I/F), etc. The CPU implements various functions by executing instructions (programs, routines) stored in ROM. The ECU 30 may be composed of a plurality of ECUs.

The ECU 30 is connected to the storage device 30a that is a non-volatile readable and writable storage device. In this example, the storage device 30a is a hard disk drive. The ECU 30 is configured to store (save) information in the storage device 30a and read the information stored (saved) in the storage device 30a. The storage device 30a is not limited to the hard disk drive and may be a well-known non-volatile readable and writable storage device or storage medium.

The ECU 30 is connected to various sensors that will be described below, and receives signals (data) output from the various sensors. The ECU 30 and the sensors for acquiring information on the vehicle 10 are sometimes referred to as the "vehicle information acquisition device" for convenience.

The vehicle state quantity sensor 31 includes a plurality of types of sensors that detect the state of the vehicle 10 (the vehicle speed, acceleration, orientation, etc. of the vehicle 10). The vehicle state quantity sensor 31 includes a vehicle speed sensor that detects the vehicle speed (vehicle body speed) of the vehicle 10, a longitudinal acceleration sensor that detects the acceleration in the longitudinal direction of the vehicle 10, a lateral acceleration sensor that detects the acceleration in the lateral direction of the vehicle 10, a yaw rate sensor that detects the yaw rate of the vehicle 10, etc., which are not shown.

The wheel load sensors 32FL to 32RR detect the wheel load of each wheel 11 and output a signal indicating the wheel load of each wheel 11. The wheel load sensors 32FL to 32RR are referred to as the "wheel load sensors 32" unless individually identified.

The wheel speed sensors 33FL to 33RR are provided for each wheel 11. The wheel speed sensors 33FL to 33RR detect the wheel angular velocity of each wheel 11, which is the rotational angular velocity of each wheel 11, and output a signal indicating the wheel angular velocity of each wheel 11. The wheel speed sensors 33FL to 33RR are referred to as the "wheel speed sensors 33" unless individually identified. The ECU 30 is configured to calculate the rotational speed, the number of rotations of the wheel (hereinafter, referred to as "the wheel rotation number") during traveling in a predetermined section, the integral of the wheel angular velocity during traveling in the predetermined section, etc. based on the wheel angular velocity. Parameters related to rotation of the wheel 11, such as the wheel rotation number and the wheel angular velocity, are referred to as the "rotation parameters" for convenience. The ECU 30 may calculate the vehicle speed of the vehicle 10 based on at least one of the four wheel angular velocities acquired from the wheel speed sensors 33FL to 33RR.

The temperature sensors 34FL to 34RR are provided for each wheel 11. The temperature sensors 34FL to 34RR detect the temperature of the tire of each wheel 11 and output a signal indicating the temperature of each tire. The temperature sensors 34FL to 34RR are referred to as the "temperature sensors 34" unless individually identified.

The air pressure sensors 35FL to 35RR are provided for each wheel 11. The air pressure sensors 35FL to 35RR detect the air pressure of the tire of each wheel 11 and output a signal indicating the air pressure of each tire. The air pressure sensors 35FL to 35RR are referred to as the "air pressure sensors 35" unless individually identified.

The camera sensor 36 includes a stereo camera and a processing unit and acquires a pair of right and left image data by capturing images of the surroundings on the right and left sides of the road ahead of the vehicle 10 at predetermined time intervals. The camera sensor 36 sends the captured image data to the ECU 30.

The ECU 30 acquires processed image data by performing image processing on the image data received from the camera sensor 36. The ECU 30 uses the processed image data to acquire (perceive) lane markers (hereinafter also simply referred to as "white lines") of the road on which the vehicle 10 is traveling.

The ECU 30 analyzes the image data sent from the camera sensor 36 and perceives (detects) the white lines on the right and left sides of the road. The ECU 30 perceives the white line on the left side of the axis of the vehicle 10 as a left white line and perceives the white line on the right side of the axis of the vehicle 10 as a right white line. The ECU 30 perceives the area between the right and left white lines as a driving lane in which the vehicle 10 is traveling. The ECU 30 perceives (sets) a lane centerline using the perceived white lines. The lane centerline is the center position in the lane (the center position between the right and left white lines.

The ECU 30 is also connected to the position acquisition device 37 and the wireless communication device 38.

The position acquisition device 37 includes a Global Navigation Satellite System (GNSS) receiver for detecting the current position of the vehicle 10, a map database, a display, etc. The GNSS receiver receives signals from GNSS satellites (positioning satellites) of the GNSS. The map database stores information including road map information. The position acquisition device 37 specifies the current position (position information (e.g., latitude and longitude)) of the vehicle 10 based on the signals received by the GNSS receiver and outputs a signal indicating the specified position. The position acquisition device 37 may detect a point cloud of feature points of a road shape, a structure, etc. by a Light Detection and Ranging (LiDAR), not shown, etc. included in the vehicle 10 and specify the position of the vehicle 10 based on the detection results and a three-dimensional map including information on the point cloud of the road shape, the structure, etc. (see, e.g., Japanese Unexamined Patent Application Publication No. 2020-16541 (JP 2020-16541 A)).

The wireless communication device 38 is a wireless communication terminal for connecting to a server (cloud 40 in this example) on the Internet. The cloud 40 is cloud computing. The cloud 40 has a "database in which road surface displacement-related information is saved in association with position information for specifying a two-dimensional position in the longitudinal and lateral directions of the road." The road surface displacement-related information is information related to vertical displacement of the road surface indicating unevenness of the road surface. Specifically, the road surface displacement-related information is at least one of a road surface displacement $z_0$, an unsprung displacement $z_1$, a road surface displacement velocity $dz_0$, and an unsprung velocity $dz_1$ that will be described later. The road surface displacement velocity $dz_0$ is a time derivative of the road surface displacement $z_0$, and the unsprung velocity $dz_1$ is a time derivative of the unsprung displacement $z_1$. In this example, the road surface displacement-related information is the unsprung displacement $z_1$.

The cloud 40 sequentially receives the road surface displacement-related information (including position information) acquired and sent by the measuring vehicle. The measuring vehicle is a vehicle having a function to acquire (measure) the road surface displacement-related information (including position information) and a function to send the information.

The cloud 40 sequentially saves the road surface displacement-related information received from a multiplicity of measuring vehicles in association with the position information in a database (the term "save" herein includes updating the database based on the received road surface displacement-related information). Accordingly, more accurate road surface displacement-related information is saved in the database in the cloud 40.

The measuring vehicle may not acquire the road surface displacement-related information itself, but may measure data from which the road surface displacement-related information can be derived and acquire the road surface displacement-related information based on the measured data. The measuring vehicle may also send the data from which the road surface displacement-related information can be derived to the cloud 40. In this case, the cloud 40 derives the road surface displacement-related information by processing the data from which the road surface displacement-related information can be derived, and saves the derived road surface displacement-related information in the database in the cloud 40.

The wireless communication device 38 can be connected to the cloud 40 so that the wireless communication device 38 can send and receive information to and from the cloud 40 by using an Internet network. The ECU 30 can therefore acquire the road surface displacement-related information of a desired position on the road (two-dimensional position in the longitudinal and vertical directions of the road) from the database in the cloud 40 via communication of the wireless communication device 38. Since the cloud 40 is present outside the vehicle 10 and has a function to store information, the cloud 40 is also referred to as the "external storage device" for convenience.

The ECU 30 is also connected to each of the left front wheel actuator 17FL, the right front wheel actuator 17FR, the left rear wheel actuator 17RL, and the right rear wheel actuator 17RR via a drive circuit (not shown).

The ECU 30 calculates a desired actuator force Fct for damping sprung vibrations of each wheel 11 and sends a command to the wheel actuators 17 to output (generate) an actuator force Fc corresponding to the desired actuator force Fct. In response to the command, the wheel actuators 17 output (generate) the actuator force Fc corresponding to the desired actuator force Fct.

As will be described in detail later, the ECU 30 estimates the position of the vehicle 10 when the position acquisition device 37 cannot acquire the position of the vehicle 10. The section of the road in which the position acquisition device 37 cannot acquire the position (position information) of the vehicle 10 is referred to as the "difficult-to-acquire position section" for convenience, and the section of the road in which the position acquisition device 37 can acquire the position (position information) of the vehicle 10 is referred to as the "position acquirable section" for convenience. Examples of the "difficult-to-acquire position section" include a section in which the position acquisition device 37 cannot communicate with the GNSS satellites and a section for which there is no three-dimensional map (when the position of the vehicle 10 is specified by the LiDAR etc.).

Overview of Basic Preview Damping Control

Figure 3:
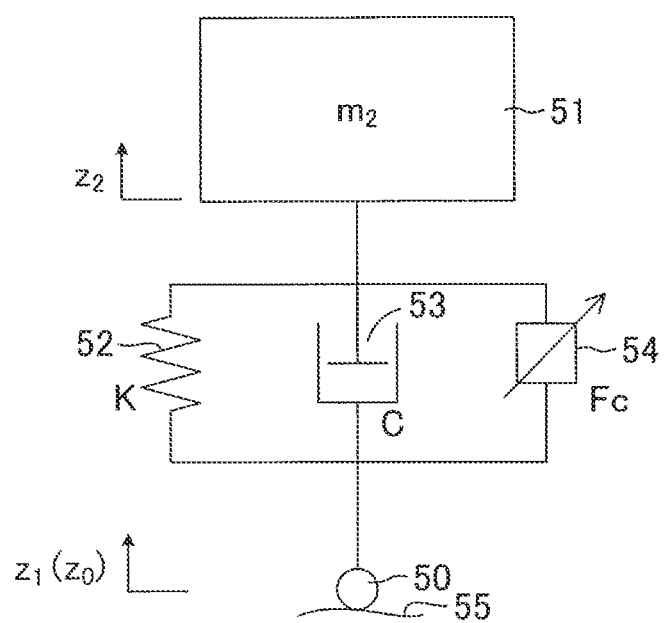
FIG. 3 illustrates a single-wheel model of a vehicle.

An overview of basic preview damping control that is performed by the damping control device 20 will be presented. FIG. 3 illustrates a single-wheel model of the vehicle 10. An unsprung portion 50 includes members located on the wheel side of the suspension spring 16 out of members such as the wheel 11 and the shock absorber 15 of the vehicle 10. A sprung portion 51 includes members located on the vehicle body side of the suspension spring 16 out of members such as the vehicle body 10a and the shock absorber 15 of the vehicle 10.

A spring 52 corresponds to the suspension spring 16, a damper 53 corresponds to the shock absorber 15, and an actuator 54 corresponds to the wheel actuator 17.

The mass of the sprung portion 51 is referred to as the sprung mass $m_2$. The vertical displacements of a road surface 55, the unsprung portion 50, and the sprung portion 51 are referred to as the road surface displacement $z_0$, the unsprung displacement $z_1$, and the sprung displacement $z_2$, respectively. The spring constant (equivalent spring constant) of the spring 52 is referred to as the spring constant K. The attenuation coefficient (equivalent attenuation coefficient) of the damper 53 is referred to as the attenuation coefficient C. The force generated by the actuator 54 is referred to the actuator force Fc. Although it is assumed that the attenuation coefficient C is constant, the actual attenuation coefficient changes according to the suspension stroke speed. Accordingly, the attenuation coefficient C may be set to vary according to, e.g., the time derivative of the stroke.

The time derivatives of $z_1$ and $z_2$ are represented by $dz_1$ and $dz_2$, respectively, and the second-order time derivatives of $z_1$ and $z_2$ are represented by $ddz_1$ and $ddz_2$, respectively. It is assumed that an upward displacement is positive for $z_0$, $z_1$, and $z_2$ and an upward force is positive for the forces generated by the spring 52, the damper 53, the actuator 54, etc.

In the single-wheel model of the vehicle 10 shown in FIG. 3, the equation of motion for vertical motion of the sprung portion 51 can be given by the equation (1).

$$m_2 ddz_2 = C(dz_1 - dz_2) + K(z_1 - z_2) - Fc \quad (1)$$

When the vibration of the sprung portion 51 is completely canceled by the actuator force Fc (that is, when the acceleration $ddz_2$, velocity $dz_2$, and sprung displacement $z_2$ of the sprung portion 51 are zero), the actuator force Fc is given by the equation (2).

$$Fc = C dz_1 + K z_1 \quad (2)$$

Accordingly, the actuator force Fc that cancels the vibration of the sprung portion 51 can be given by the equation (3). In the equation (3), "α" represents any constant greater than 0 and equal to or smaller than 1.

$$Fc = \alpha(C dz_1 + K z_1) \quad (3)$$

The equation (1) can be given by the equation (4) by substituting the equation (3) for "Fc" in the equation (1).

$$m_2 ddz_2 = C(dz_1 - dz_2) + K(z_1 - z_2) - \alpha(C dz_1 + K z_1) \quad (4)$$

The equation (4) can be given by the equation (5) by Laplace transform. That is, the transfer function from the unsprung displacement $z_1$ to the sprung displacement $z_2$ is given by the equation (5). In the equation (5), "s" represents a Laplace operator.

$$\frac{z_2}{z_1} = \frac{(1-\alpha)(Cs+K)}{m_2 s^2 + Cs + K} \quad (5)$$

According to the equation (5), the transfer function changes according to α and has a minimum value when α is 1. Based on this, the desired actuator force Fct can be given by the equation (6) obtained by replacing αC and αK in the equation (3) with a gain $\beta_1$ and a gain $\beta_2$, respectively.

$$Fct = \beta_1 \times dz_1 + \beta_2 \times z_1 \quad (6)$$

The ECU 30 acquires in advance the unsprung displacement $z_1$ at the position the wheel 11 will pass later (two-dimensional position in the longitudinal and lateral directions of the road), and calculates the desired actuator force Fct of the actuator 54 by substituting the acquired unsprung displacement $z_1$ for "$z_1$" in the equation (6) in which the gains $\beta_1$, $\beta_2$ have been adjusted as appropriate. The ECU 30 causes the actuator 54 to generate an actuator force Fc corresponding to the calculated desired actuator force Fct at the timing the unsprung displacement $z_1$ substituted in the equation (6) occurs. Vibration of the sprung portion 51 is thus reduced when the unsprung displacement $z_1$ substituted in the equation (6) occurs.

The desired actuator force Fct of the actuator 54 may be calculated based on the equation (7) obtained by omitting the derivative term ($\beta_1 \times dz_1$) from the equation (6), instead of the equation (6). In this case as well, since the actuator force Fc ($=\beta_2 \times z_1$) that cancels vibration of the sprung portion 51 is generated by the actuator 54, vibration of the sprung portion 51 is reduced as compared to the case where the actuator force Fc is not generated.

$$Fct = \beta_2 \times z_1 \quad (7)$$

The ECU 30 thus calculates the desired actuator force Fct based on the equation (6) or the equation (7) using the unsprung displacement $z_1$ at a predicted passage position of the wheel 11, namely a position the wheel 11 is predicted to pass. The ECU 30 controls the wheel actuator 17 to output (generate) an actuator force Fc corresponding to the calculated desired actuator force Fct at the timing the wheel 11 actually passes the predicted passage position of the wheel 11. The control described above is damping control for the sprung portion 51. This damping control for the sprung portion 51 is referred to as the "preview damping control."

In this single-wheel model, the mass of the unsprung portion 50 and elastic deformation of the tire are ignored, and it is assumed that the road surface displacement $z_0$ and the unsprung displacement $z_1$ are substantially the same. Accordingly, the same preview damping control may be performed using the road surface displacement $z_0$ instead of the unsprung displacement $z_1$.

Figure 4:
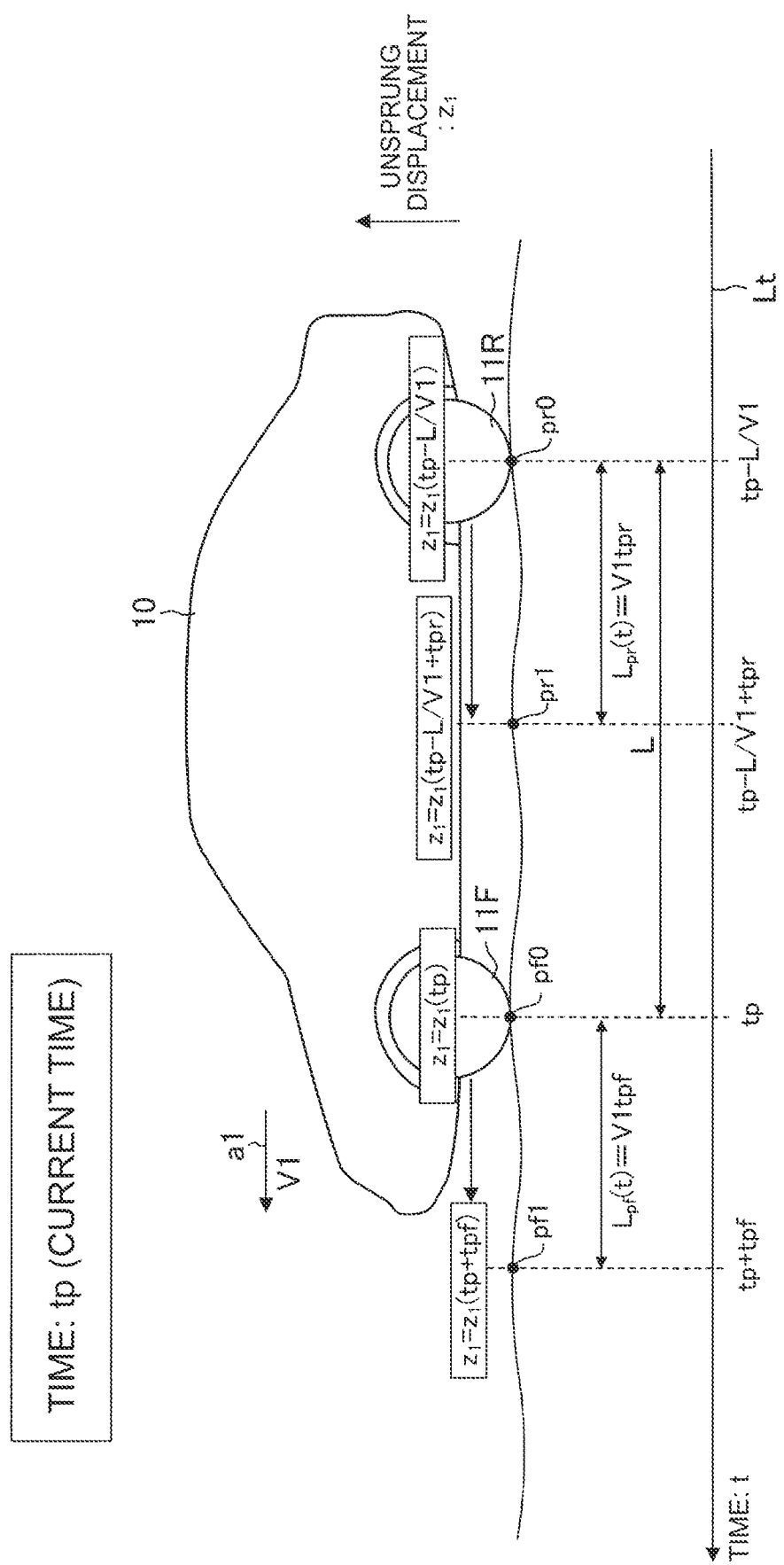
FIG. 4 is a diagram illustrating preview damping control.
Figure 5:
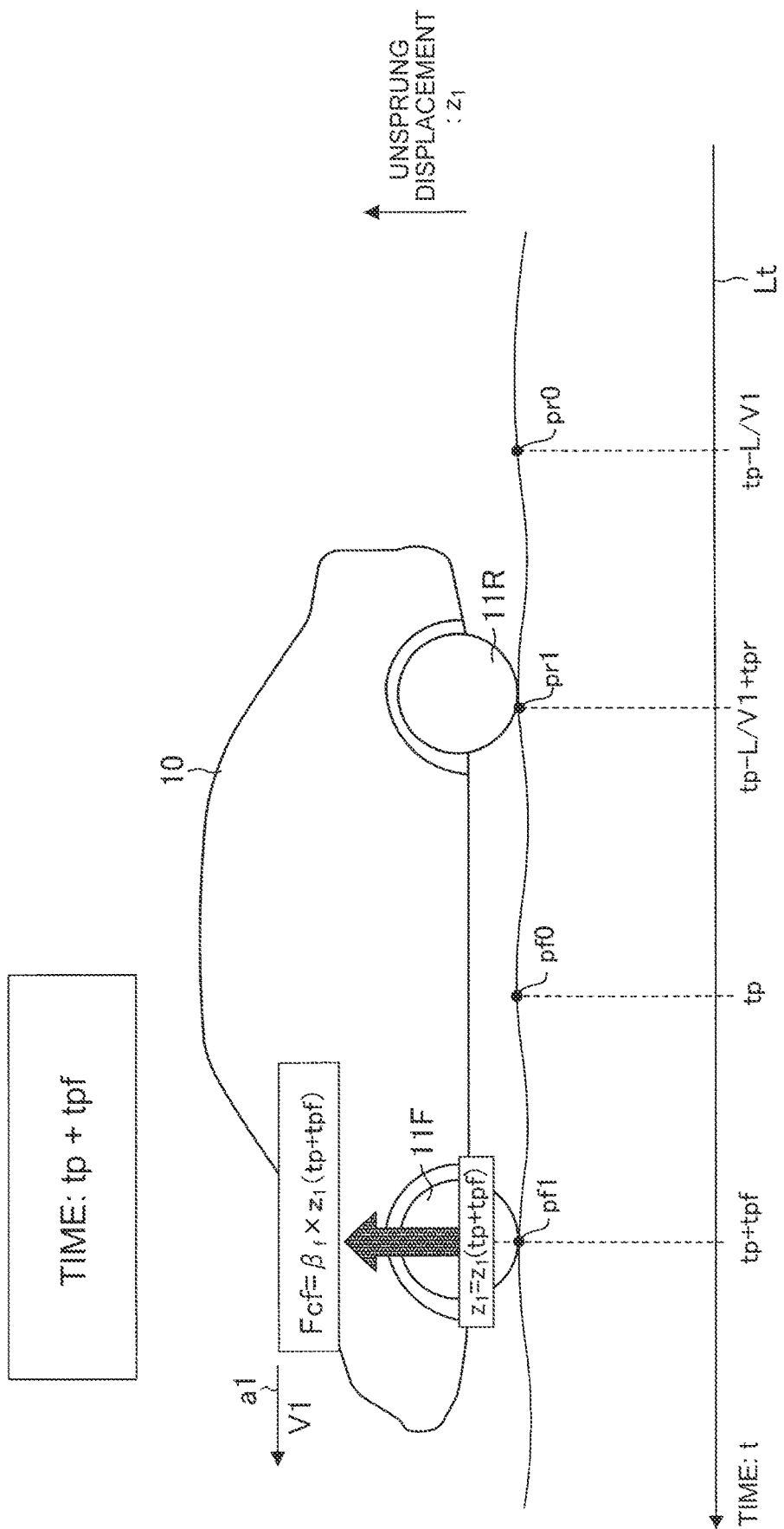
FIG. 5 is another diagram illustrating the preview damping control.
Figure 6:
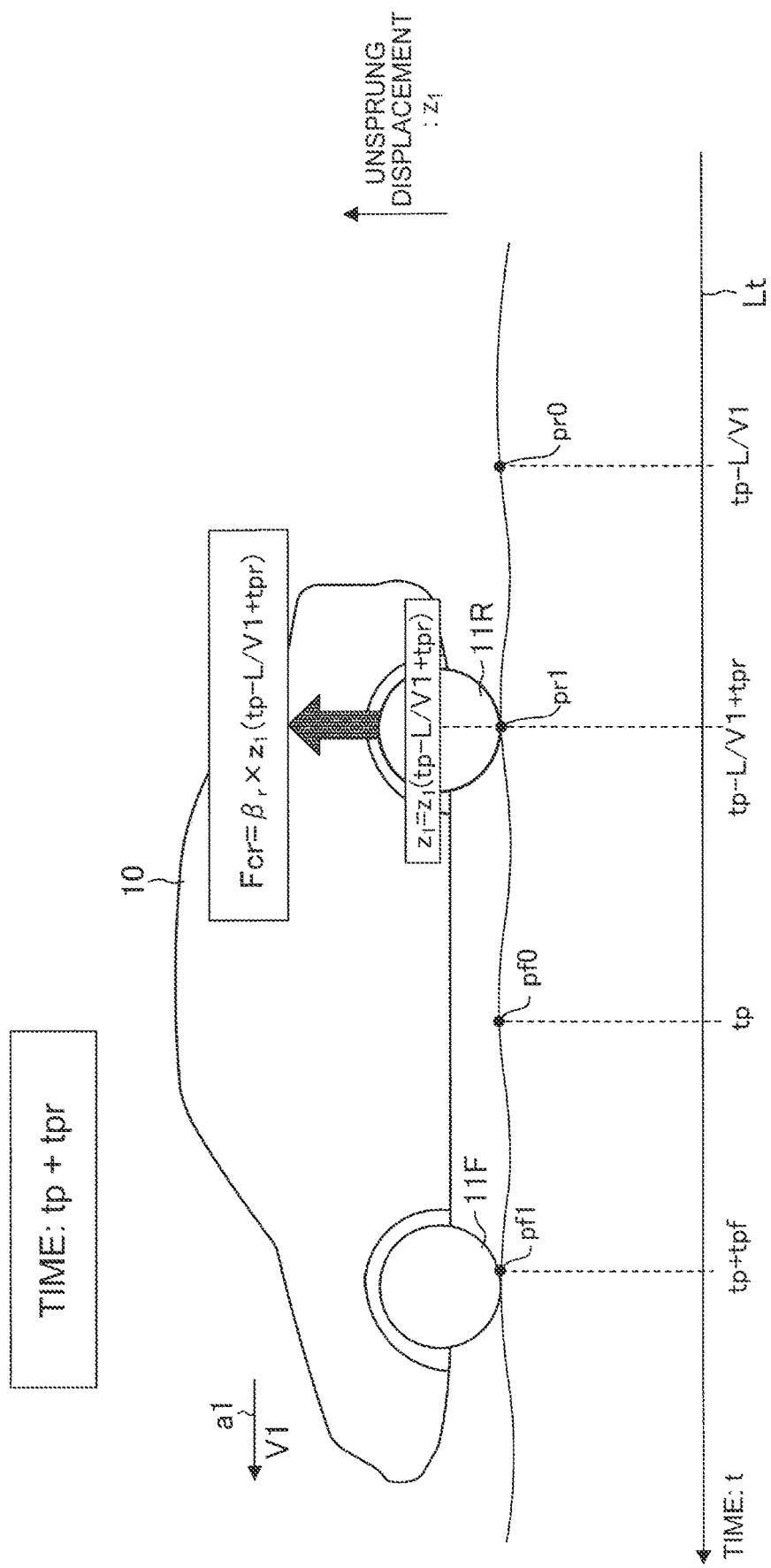
FIG. 6 is still another diagram illustrating the preview damping control.

The preview damping control using the unsprung displacement $z_1$ and the equation (7) will be described in detail with reference to FIGS. 4 to 6. FIG. 4 illustrates the vehicle 10 traveling at a vehicle speed V1 in the traveling direction shown by arrow a1 at the current time tp. In the following description, the front wheel 11F and the rear wheel 11R refer to the wheels on the same side ("left front wheel 11FL and left rear wheel 11RL" or "right front wheel 11FR and right rear wheel 11RR"), and it is assumed that the moving speed of the front wheel 11F and the rear wheel 11R is the same as the vehicle speed V1.

In FIG. 4, the unsprung displacements $z_1$ on the path of the front wheel 11F at the present, past, and future times t are represented by a function $z_1(t)$ of an imaginary time axis t shown by line Lt. Accordingly, the unsprung displacement $z_1$ at a position (ground contact point) pf0 of the front wheel 11F at the current time tp is represented by $z_1(tp)$. Hereinafter, the path of the front wheel 11F is also referred to as the "front wheel path."

Assuming that the path of the rear wheel 11R is the same as the front wheel path, the unsprung displacement $z_1$ at a position pr0 of the rear wheel 11R of the vehicle 10 at the current time tp is represented by the unsprung displacement $z_1(tp-L/V1)$ at a time "tp−L/V1."

That is, this unsprung displacement $z_1$ is represented by the unsprung displacement $z_1(tp-L/V1)$ at the time "tp−L/V1" that is (L/V1) before (prior to) the current time tp. As used herein, (L/V1) is the time it takes for the front wheel 11F to move the distance of the wheelbase length L of the vehicle 10.

The ECU 30 specifies a predicted passage position pf1 of the front wheel 11F at a time that is a front wheel lookahead time tpf later than (ahead of) the current time tp. The front wheel lookahead time tpf is set to the time it takes from when the ECU 30 specifies the predicted passage position pf1 of the front wheel 11F until the front wheel actuator 17F outputs an actuator force Fcf corresponding to a desired actuator force Fcft.

The predicted passage position pf1 of the front wheel 11F is the position on the front wheel path the front wheel 11F reaches when it moves the distance $L_{pf}(t)=V1 \times tpf$ from the position pf0 at the current time tp. Accordingly, the ECU 30 can specify the predicted passage position pf1 of the front wheel 11F as follows.

The ECU 30 specifies the position of the front wheel 11F of the vehicle 10, the vehicle speed, and the orientation of the vehicle 10 based on the information on the position of the vehicle 10 (e.g., the current position of the vehicle 10 and the change in position of the vehicle 10 with time) acquired from the position acquisition device 37. The ECU 30 specifies the front wheel path based on the specified position pf0 of the front wheel 11F of the vehicle 10, vehicle speed V1, and orientation of the vehicle 10. The ECU 30 calculates the position on the front wheel path that is ahead of the position pf0 by $L_{pf}(t)$ by using the position pf0, the vehicle speed V1, the front wheel lookahead time tpf, and the front wheel path. The ECU 30 specifies the calculated position as the predicted passage position pf1 of the front wheel 11F.

The ECU 30 also calculates the desired actuator force Fcft using the unsprung displacement $z_1(tp+tpf)$ at the specified predicted passage position pf1 of the front wheel 11F.

Specifically, the ECU 30 sequentially acquires from the cloud 40 the unsprung displacements $z_1$ in a predetermined area ahead of the vehicle 10 (data that can specify the unsprung displacement $z_1$ associated with the position information, based on the position information), and temporarily saves the acquired unsprung displacements $z_1$ in the RAM. This predetermined area is set to the area including at least the predicted passage position pf1 of the front wheel 11F and a predicted passage position pr1 of the rear wheel 11R that will be described later. The ECU 30 temporarily saves the unsprung displacements $z_1$ in the predetermined area including the predicted passage position pf1 and the predicted passage position pr1 at least until the ECU 30 actually specifies the predicted passage position pf1 and the predicted passage position pr1.

The ECU 30 calculates the desired actuator force Fcft as follows by using the unsprung displacement $z_1(tp+tpf)$ at the predicted passage position pf1 out of the unsprung displacements $z_1$ in the predetermined area temporarily saved in the RAM (i.e., by using the unsprung displacement $z_1(tp+tpf)$ at the predicted passage position pf1 acquired by the CPU from the RAM).

The ECU 30 calculates the desired actuator force Fcft by substituting the unsprung displacement $z_1(tp+tpf)$ at the predicted passage position pf1 of the front wheel 11F for "$z_1$" in the equation (8). That is, the ECU 30 calculates the desired actuator force Fcft by the equation (9). The equation (8) corresponds to the above equation (7) and is obtained by replacing "Fct" and "$\beta_2$" in the equation (7) with "Fcft" and "$\beta_f$," respectively.

$$Fcft=\beta_f \times z_1 \tag{8}$$

$$Fcft=\beta_f \times z_1(tp+tpf) \tag{9}$$

The ECU 30 then sends a command to the front wheel actuator 17F to output an actuator force Fcf corresponding to the calculated desired actuator force Fcft. As shown in FIG. 5, in response to the command, the front wheel actuator 17F outputs the actuator force Fcf corresponding to the desired actuator force Fcft at a time "tp+tpf" that is the front wheel lookahead time tpf later than the current time tp.

The front wheel actuator 17F can thus output the actuator force Fcf that appropriately reduces vibration of the sprung portion 51 caused by the unsprung displacement $z_1$ at the predicted passing position pf1 of the front wheel 11F at the timing the front wheel 11F actually passes the predicted passing position pf1.

Similarly, at the current time tp, the ECU 30 specifies the predicted passage position pr1 of the rear wheel 11R at a time that is a rear wheel lookahead time tpr later than (ahead of) the current time tp. The rear wheel lookahead time tpr is set to the time it takes from when the ECU 30 specifies the predicted passage position pr1 of the rear wheel 11R until the rear wheel actuator 17R outputs an actuator force Fcr corresponding to a desired actuator force Fcrt.

Assuming that the front wheel path is the path of the rear wheel 11R, the predicted passage position pr1 of the rear wheel 11R is the position on the front wheel path the rear wheel 11R reaches when it moves the distance $L_{pr}(t)=V1 \times tpr$ from the position pr0 at the current time tp. Accordingly, the ECU 30 can specify the predicted passage position pr1 of the rear wheel 11R as follows.

The ECU 30 calculates the position on the front wheel path that is ahead of the position pr0 by $L_{pr}(t)$ by using the position pr0, the vehicle speed V1, the rear wheel lookahead time tpr, and the front wheel path. The ECU 30 specifies the calculated position as the predicted passage position pr1 of the rear wheel 11R.

The ECU 30 also calculates the desired actuator force Fcrt using the unsprung displacement $z_1(tp-L/V1+tpr)$ at the specified predicted passage position pr1 of the rear wheel 11R.

Specifically, the ECU 30 calculates the desired actuator force Fcrt as follows by using the unsprung displacement $z_1(tp-L/V1+tpr)$ at the predicted passage position pr1 out of the unsprung displacements $z_1$ in the predetermined area temporarily saved in the RAM.

The ECU 30 calculates the desired actuator force Fcrt by substituting the unsprung displacement $z_1(tp-L/V1+tpr)$ at the predicted passage position pr1 of the rear wheel 11R for "$z_1$" in the equation (10). That is, the ECU 30 calculates the desired actuator force Fcrt by the equation (11). The equation (10) corresponds to the above equation (7) and is obtained by replacing "Fct" and "$\beta_2$" in the equation (7) with "Fcrt" and "$\beta_r$," respectively.

$$Fcrt=\beta_r \times z_1 \tag{10}$$

$$Fcrt=\beta_r \times z_1(tp-L/V1+tpr) \tag{11}$$

The ECU 30 then sends a command to the rear wheel actuator 17R to output an actuator force Fcr corresponding to the calculated desired actuator force Fcrt. As shown in FIG. 6, in response to the command, the rear wheel actuator 17R outputs the actuator force Fcr corresponding to the desired actuator force Fcrt at a time "tp+tpr" that is the rear wheel lookahead time tpr later than the current time tp.

The rear wheel actuator 17R can thus output the actuator force Fcr that appropriately reduces vibration of the sprung portion 51 caused by the unsprung displacement $z_1$ at the predicted passing position pr1 of the rear wheel 11R at the timing the rear wheel 11R actually passes the predicted passing position pr1.

The ECU 30 may send a command to the rear wheel actuator 17R to output the actuator force Fcr corresponding to the desire actuator force Fcrt ($=(\beta_r/\beta_f)$Fcft, Fcft=$\beta_f z_1(tp)$) calculated based on the unsprung displacement $z_1(tp)$ at the position pf0 of the front wheel 11F at the current time tp at the timing the rear wheel 11R passes the predicted passage position pr1 of the rear wheel 11R. The control described above is the overview of the basic preview damping control that is performed by the damping control device 20.

Overview of Operation

An overview of the operation of the position estimation device according to the embodiment of the present disclosure will be described. As described above, the position estimation device is incorporated in the damping control device 20 and includes the ECU 30, the storage device 30a, the vehicle state quantity sensor 31, the wheel load sensors 32FL to 32RR, the wheel speed sensors 33FL to 33RR, the temperature sensors 34FL to 34RR, the air pressure sensors 35FL to 35RR, the camera sensor 36, the position acquisition device 37, and the wireless communication device 38.

The ECU 30 performs the preview damping control based on the position of the vehicle 10 acquired by the position acquisition device 37. However, while the vehicle 10 is traveling in the difficult-to-acquire position section, the position acquisition device 37 cannot acquire the position of the vehicle 10 and therefore the ECU 30 cannot acquire the position of the vehicle 10 from the position acquisition device 37.

In this case, the ECU 30 calculates the traveled distance TL of the vehicle 10. The traveled distance TL is the traveled distance of the vehicle 10 from a specific position of the vehicle 10 acquired while the vehicle 10 was traveling in the position acquirable section (in this example, a position the vehicle 10 passed immediately before the start position of the difficult-to-acquire position section). The ECU 30 calculates the traveled distance TL by "wheel rotation number× $2\pi \times$ tire rolling radius." The ECU 30 estimates the position of the vehicle 10 using the calculated traveled distance TL.

However, the tire rolling radius changes according to the vehicle speed of the vehicle 10. The tire rolling radius also changes according to the wheel load, tire temperature, and tire air pressure of the wheel 11. In order to calculate an accurate traveled distance TL while the vehicle 10 is traveling in the difficult-to-acquire position section, the tire rolling radius after the change may be obtained.

Accordingly, while the vehicle 10 is traveling in the position acquirable section, the ECU 30 detects a correction factor calculation section with a predetermined distance L0 based on an accurate position (position information) of the vehicle 10 acquired by the position acquisition device 37. The ECU 30 also measures the wheel rotation number Nr during traveling of the vehicle 10 in the correction factor calculation section with the predetermined distance L0. In this case, the predetermined distance L0 is given by "wheel rotation number Nr during traveling in the correction factor calculation section×2π×actual tire rolling radius."

The actual tire rolling radius is given by "reference tire rolling radius R0×correction factor Cf." The reference tire rolling radius R0 is a preset tire rolling radius that is used as a reference, and the correction factor Cf is a correction factor for correcting the reference tire rolling radius R0 to the actual tire rolling radius. The predetermined distance L0 is therefore given by the following equation: predetermined distance L0="wheel rotation number Nr during traveling in the correction factor calculation section×2π×reference tire rolling radius R0×correction factor Cf." Accordingly, the ECU 30 can calculate the correction factor Cf by the equation (12) which is a modified form of this equation. The predetermined distance L0 is sometimes referred to as the "reference distance" for convenience, and the distance given by "wheel rotation number Nr during traveling in the correction factor calculation section×2π×reference tire rolling radius R0×correction factor Cf" is sometimes referred to as the "comparative distance" for convenience.

$$Cf=L0/(Nr\times2\pi\times R0) \quad (12)$$

Figure 7:
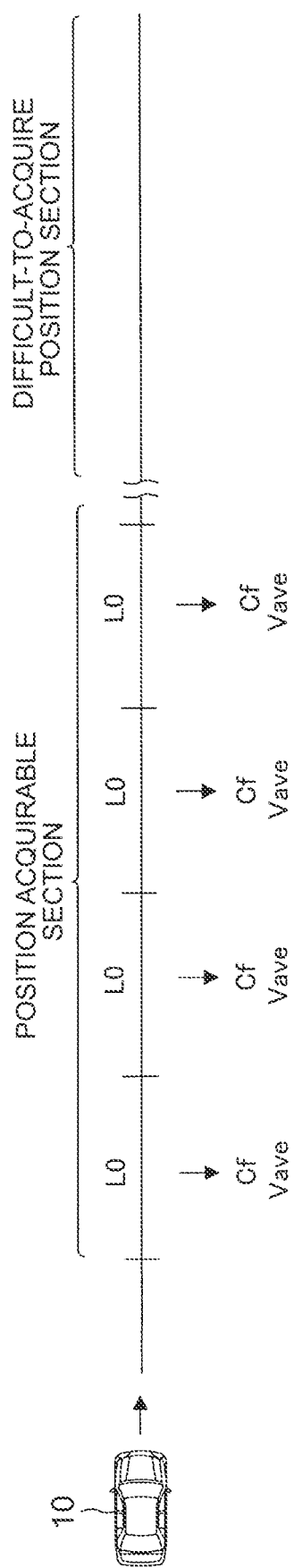
FIG. 7 is a diagram schematically illustrating an overview of the operation of a position estimation device.

As shown in FIG. 7, the ECU 30 calculates the correction factor Cf and an average vehicle speed Vave during traveling in the correction factor calculation section by the equation (12) every time the vehicle 10 travels in the correction factor calculation section with the predetermined distance L0. As described above, the tire rolling radius changes according to the vehicle speed of the vehicle 10. Therefore, in order to calculate an accurate actual tire rolling radius, in some examples, the ECU 30 uses the correction factor Cf according to the vehicle speed. The actual tire rolling radius also changes according to the wheel load, tire temperature, and tire air pressure of the wheel 11. Therefore, in order to calculate a more accurate tire rolling radius, in some examples, when at least one of the wheel load, tire temperature, and tire air pressure of the wheel 11 is different, the ECU 30 uses the correction factor Cf according to the difference even if the vehicle speed is the same.

Accordingly, the ECU 30 selects a vehicle speed range including the average vehicle speed Vave during traveling of the vehicle 10 in the correction factor calculation section from a plurality of vehicle speed ranges defined in advance. The ECU 30 also acquires the wheel load, tire temperature, and tire air pressure of the wheel 11 (via the wheel load sensor 32, the temperature sensor 34, and the air pressure sensor 35) during traveling of the vehicle 10 in the correction factor calculation section.

When the correction factor Cf for the same vehicle speed range as the selected vehicle speed range has not been stored in the storage device 30*a*, the ECU 30 stores the calculated correction factor Cf in association with (linked to) the selected vehicle speed range in the storage device 30*a*. The ECU 30 also stores the acquired wheel load, tire temperature, and tire air pressure of the wheel 11 in association with the selected vehicle speed range and the calculated correction factor Cf in the storage device 30*a*.

In this example, a first vehicle speed range, a second vehicle speed range, and a third vehicle speed range are set as the vehicle speed ranges. The number of vehicle speed ranges may be two or four or more.

The first vehicle speed range is a vehicle speed range that is equal to or lower than the vehicle speed V1.

The second vehicle speed range is a vehicle speed range that is higher than the vehicle speed V1 and equal to or lower than a vehicle speed V2.

The third vehicle speed range is a vehicle speed range that is higher than the vehicle speed V2.

V1 and V2 have a relationship of 0<V1<V2. V1 and V2 are set to appropriate values obtained in advance by experiments etc.

When the correction factor Cf for the same vehicle speed range as the selected vehicle speed range has already been stored in the storage device 30*a*, the ECU 30 determines whether at least one of first to third conditions that will be described later is satisfied. The ECU 30 thus determines whether at least one of the acquired wheel load, tire temperature, and tire air pressure of the wheel 11 has changed to an extent that affects the tire rolling radius (i.e., has changed by a predetermined threshold or more) from the wheel load, tire temperature, and tire air pressure of the wheel 11 associated with the correction factor Cf stored in the storage device 30*a* (stored correction factor Cf).

That is, when at least one of the first to third conditions is satisfied, the ECU 30 determines that at least one of the acquired wheel load, tire temperature, and tire air pressure of the wheel 11 has changed to the extent that affects the tire rolling radius from the wheel load, tire temperature, and tire air pressure of the wheel 11 associated with the stored correction factor Cf. When none of the first to third conditions are satisfied, the ECU 30 determines that none of the acquired wheel load, tire temperature, and tire air pressure of the wheel 11 have changed to the extent that affects the tire rolling radius from the wheel load, tire temperature, and tire air pressure of the wheel 11 associated with the stored correction factor Cf.

First condition: The absolute value of the difference between the wheel load W1 of the wheel 11 associated with the stored correction factor Cf and the wheel load W2 of the wheel 11 to be associated with the calculated correction factor Cf is equal to or larger than a threshold wheel load Wth (|W1−W2| Wth).

Second condition: The absolute value of the difference between the tire temperature T1 associated with the stored correction factor Cf and the tire temperature T2 to be associated with the calculated correction factor Cf is equal to or larger than a threshold tire temperature Tth (|T1−T2| Tth).

Third condition: The absolute value of the difference between the tire air pressure AP1 associated with the stored correction factor Cf and the tire air pressure AP2 to be associated with the calculated correction factor Cf is equal to or larger than a threshold tire air pressure APth (|AP1−AP2|≥APth).

The threshold wheel load Wth, the threshold tire temperature Tth, and the threshold tire air pressure APth are set to positive values suitable for the determination.

When none of the first to third conditions are satisfied, the ECU 30 calculates a value (e.g., average value or weighted average value) based on the stored correction factor Cf and a correction factor Cf to be newly stored, and stores the calculated value in association with the selected vehicle speed range in the storage device 30*a*. That is, the ECU 30 rewrites the value of the correction factor Cf that has already been stored in association with the selected vehicle speed range in the storage device 30*a* with the calculated value.

The ECU 30 may rewrite the value of the correction factor Cf that has already been stored in association with the selected vehicle speed range in the storage device 30a with the correction factor Cf to be newly stored. The ECU 30 may retain the value of the correction factor Cf that has already been stored in association with the specified vehicle speed range in the storage device 30a without rewriting this value of the correction factor Cf with the correction factor Cf to be newly stored.

When at least one of the first to third conditions is satisfied, the ECU 30 stores the calculated value of the correction factor Cf in association with the selected vehicle speed range in the storage device 30a. That is, the ECU 30 rewrites the correction factor Cf that has already been stored in association with the selected vehicle speed range in the storage device 30a with the calculated correction factor Cf.

Thereafter, when the vehicle 10 is traveling in the difficult-to-acquire position section, the ECU 30 corrects the reference tire rolling radius R0 to a tire rolling radius that is more accurate with respect to the actual tire rolling radius by using the correction factor Cf stored in the storage device 30a and corresponding to the vehicle speed range including the vehicle speed of the vehicle 10.

The ECU 30 measures the traveled distance TL from a specific position that can be acquired by the position acquisition device 37 (a position the vehicle 10 passed immediately before the start position of the difficult-to-acquire position section) by using the corrected tire rolling radius (=R0×Cf). When the vehicle 10 is traveling in the difficult-to-acquire position section (when the position acquisition device 37 cannot acquire the position of the vehicle 10), the ECU 30 estimates the current position (self-position) of the vehicle 10 based on the specific position, the measured traveled distance TL, and the lateral position (position in the lateral direction of the lane).

Specifically, the ECU 30 calculates the traveled distance TL from the specific position that can be acquired by the position acquisition device 37 by using the equation (13).

$$TL = Np \times 2\pi \times R0 \times Cfp + \Sigma_{k=1}^{p-1}(Nk \times 2\pi \times R0 \times Cfk) \quad (13)$$

The traveled distance TL in a section in which the vehicle 10 is traveling at vehicle speeds included in the same vehicle speed range (hereinafter referred to as the "same vehicle speed range section") can be calculated by multiplying the wheel rotation number N calculated from the start position of the same vehicle speed range section (measurement start position), $2\pi$, the reference tire rolling radius R0, and the correction factor Cf corresponding to this vehicle speed range. Accordingly, the distance from the start position of the same vehicle speed range section is given by "N×2π×R0×Cf."

The traveled distance TL from the position immediately before the start position of the difficult-to-acquire position section is the sum of the distance from the start position of the same vehicle speed range section and the distance up to the start position of the same vehicle speed range section in which the vehicle 10 is currently traveling (current same vehicle speed range section). The distance up to the start position of the same vehicle speed range section is the cumulative value (accumulated value) of the distances of the same vehicle speed range sections in which the vehicle 10 have traveled. Therefore, the traveled distance TL is represented by the sum of the distance from the start position of the current same vehicle speed range section and the distance from the position immediately before the start position of the difficult-to-acquire position section to the start position of the current same vehicle speed range section (the cumulative value of the distances of the same vehicle speed range sections in which the vehicle 10 have traveled). Accordingly, the traveled distance TL can be calculated by the equation (13). In the equation (13), "p" represents the number of the same vehicle speed range section in which the vehicle 10 is currently traveling. The same vehicle speed range sections are numbered from "1" from the same vehicle speed range section located at the start position of the difficult-to-acquire section. The number of the same vehicle speed range section is set to an initial value ("1") when the vehicle 10 has passed the difficult-to-acquire section. The correction factor corresponding to the same vehicle speed range section numbered "m" is represented by "Cfm." The wheel rotation number during traveling of the vehicle 10 from the start position of the same vehicle speed range section numbered "m" to the end position of this same vehicle speed range section is represented by "Nm" (when m=p, "Np" represents the wheel rotation number during traveling of the vehicle 10 from the start position of the same vehicle speed range section numbered "p" to the current position of the vehicle 10). In this example, "m" is an integer of 1 or more.

Figure 8:
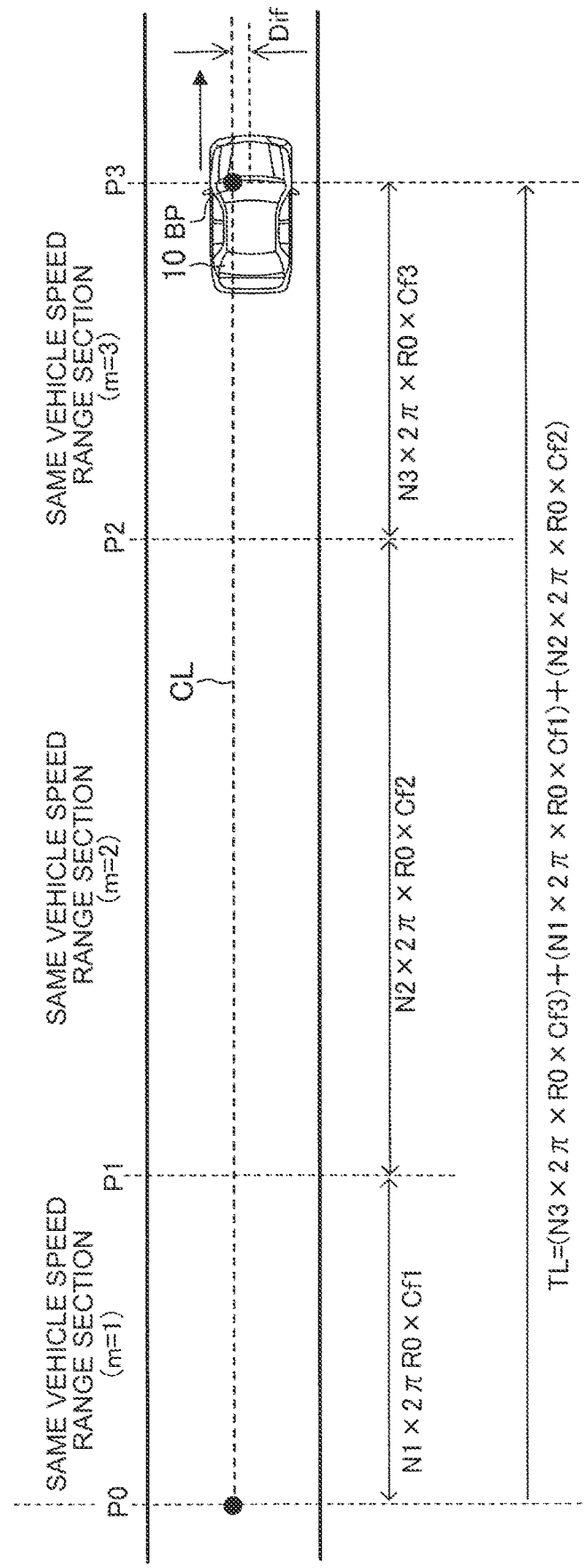
FIG. 8 is another diagram illustrating an overview of the operation of the position estimation device.

For example, as shown in FIG. 8, it is assumed that the vehicle 10 travels from a point P0 to a point P1 at vehicle speeds included in the first vehicle speed range, travels from a point immediately ahead of the point P1 to a point P2 at vehicle speeds included in the second vehicle speed range, and travels from a point immediately ahead of the point P2 to a current position P3 at vehicle speeds included in the third vehicle speed range. In this case, the ECU 30 estimates the current position P3 of the vehicle 10 as follows.

Since the number (m) of the same vehicle speed range section in which the vehicle 10 is currently traveling is "3," the ECU 30 calculates the traveled distance TL by the equation (14) obtained by substituting 3 for "p" in the equation (13).

$$TL = N3 \times 2\pi \times R0 \times Cf3 + \{(N1 \times 2\pi \times R0 \times Cf1) + (N2 \times 2\pi \times R0 \times Cf2)\} \quad (14)$$

Assuming that the vehicle 10 has traveled in the center of the lane (on the centerline CL of the lane) by the traveled distance TL, the ECU 30 specifies a position BP (also referred to as the "reference position BP" for convenience) that is ahead of the position immediately before the start position of the difficult-to-acquire position section by the traveled distance TL on the centerline CL of the lane of the vehicle 10 perceived by the camera sensor 36. That is, the ECU 30 specifies the reference position BP based on the specific position located immediately before the start position of the difficult-to-acquire position section and acquired while the vehicle 10 was traveling in the position acquirable section and the traveled distance TL.

The ECU 30 calculates a deviation Dif in the lateral direction of the lane (the lateral direction of the road) from the centerline CL of the lane in which the vehicle 10 is traveling. The ECU 30 estimates (specifies) the position offset in the lateral direction of the lane from the specified position BP (reference position BP) on the centerline CL by the calculated deviation Dif as the current position of the vehicle 10. That is, the ECU 30 estimates the current position based on the reference position BP and the deviation Dif.

The ECU 30 then performs the preview damping control described above by using the estimated current position of the vehicle 10. That is, the ECU 30 specifies the position of each wheel 11 by using the estimated position of the vehicle 10, acquires from the cloud 40 the road surface displacement-related information of the predicted passage position of each wheel 11 based on the position of each wheel 11, and performs the preview damping control based on the acquired road surface displacement-related information. In the case where the difficult-to-acquire position section is also a section in which it is difficult for the wireless communication device 38 and the cloud 40 to communicate with each other, the ECU 30 stores in advance the road surface displacement-related information associated with the position information of the difficult-to-acquire position section in the storage device 30*a*, and acquires the road surface displacement-related information of the predicted passage position of each wheel 11 from the storage device 30*a*.

Specific Operation

The CPU of the ECU 30 (hereinafter simply referred to as the "CPU") executes a routine shown by the flowchart of FIG. 9 at predetermine time intervals.

At a predetermined timing, the CPU starts the process in step 900. The CPU then determines in step 905 whether the vehicle 10 is traveling in a position acquirable section.

When the vehicle 10 is not traveling in a position acquirable section, that is, when the CPU determines "No" in step 905, the routine proceeds to step 995 and is ended.

When the vehicle 10 is traveling in a position acquirable section, that is, when "Yes" in step 905, the routine proceeds to step 910. In step 910, the CPU measures the traveled distance of the vehicle 10 from a measurement start position based on the position of the vehicle 10 acquired by the position acquisition device 37. In the case where the measurement start position has not been set at the time the CPU performs step 910, the CPU sets the measurement start position to the current position of the vehicle 10 acquired by the position acquisition device 37 and then measures the distance from the measurement start position.

The routine then proceeds to step 915. In step 915, the CPU determines based on the measured traveled distance of the vehicle 10 whether the vehicle 10 has traveled in a section (correction factor calculation section) with the predetermined distance L0.

When the vehicle 10 has not traveled in a section with the predetermined distance L0, that is, when the CPU determines "No" in step 915, the routine proceeds to step 995 and is ended.

On the other hand, when the vehicle 10 has traveled in a section with the predetermined distance L0, that is, when the CPU determines "Yes" in step 915, the routine proceeds to step 920.

In step 920, the CPU performs a correction factor calculation process by executing a routine shown in FIG. 10. More specifically, when the routine shown in FIG. 9 proceeds to step 920, this routine proceeds to step 1000 shown in FIG. 10. The CPU then sequentially performs steps 1005 to 1030 described below. Thereafter, the routine proceeds to step 1035.

Step 1005: The CPU acquires the reference tire rolling radius R0. The reference tire rolling radius R0 is stored in advance in the ROM.

Step 1010: The CPU acquires the wheel rotation number Nr during traveling of the vehicle 10 in the section (correction factor calculation section) with the distance L0. In this example, the wheel rotation number Nr is the wheel rotation number Nr acquired from one of the wheel speed sensors 33FL to 33RR.

Step 1015: The CPU calculates the correction factor Cf for the reference tire rolling radius R0 by the above equation (12).

Step 1020: The CPU calculates the average value of the vehicle speeds (average vehicle speed Vave) during traveling of the vehicle 10 in the correction factor calculation section. In this example, the vehicle speeds are the vehicle speeds calculated based on the wheel angular velocity of the wheel 11 whose wheel rotation number Nr was acquired in step 1010 (the same applies to step 1115 that will be described later).

Step 1025: The CPU acquires the wheel load, tire temperature, and tire air pressure of the wheel 11 during traveling of the vehicle 10 in the correction factor calculation section. In this example, the wheel load, tire temperature, and tire air pressure of the wheel 11 are the wheel load, tire temperature, and tire air pressure of the wheel 11 whose wheel rotation number Nr was acquired in step 1010 (the same applies to step 1125 that will be described later).

Step 1030: The CPU selects a vehicle speed range including the calculated average vehicle speed Vave from the plurality of vehicle speed ranges.

In step 1035, the CPU determines whether the correction factor Cf for the selected vehicle speed range has already been stored in the storage device 30*a*.

When the correction factor Cf for the selected vehicle speed range has not been stored in the storage device 30*a*, that is, when the CPU determines "No" in step 1035, the routine proceeds to step 1040 described below and then to step 925 in FIG. 9 via step 1095.

Step 1040: The CPU stores the calculated correction factor Cf in association with the selected vehicle speed range, the wheel load, tire temperature, and tire air pressure of the wheel 11 in the storage device 30*a*.

In step 925, the CPU newly sets the measurement start position to the position ahead of the current measurement start position by the distance L0 on the path along which the vehicle 10 has traveled. The routine then proceeds to step 995 and is ended.

On the other hand, when the correction factor Cf for the selected vehicle speed range has already been stored in the storage device 30*a*, that is, when the CPU determines "Yes" in step 1035, the routine proceeds to step 1045. In step 1045, the CPU determines whether at least one of the wheel load, tire temperature, and tire air pressure of the wheel 11 (acquired in step 1025) to be associated with the correction factor Cf calculated in step 1015 has changed to the extent that affects the tire rolling radius from the wheel load, tire temperature, and tire air pressure of the wheel 11 associated with the stored correction factor Cf.

This determination is made as follows. When at least one of the first to third conditions described above is satisfied, the CPU determines that at least one of the wheel load, tire temperature, and tire air pressure of the wheel 11 to be associated with the calculated correction factor Cf has changed to the extent that affects the tire rolling radius from the wheel load, tire temperature, and tire air pressure of the wheel 11 associated with the stored correction factor Cf. When none of the first to third conditions are satisfied, the CPU determines that none of the wheel load, tire temperature, and tire air pressure of the wheel 11 to be associated with the calculated correction factor Cf have changed to the extent that affects the tire rolling radius from the wheel load, tire temperature, and tire air pressure of the wheel 11 associated with the stored correction factor Cf.

When at least one of the first to third conditions is satisfied, that is, when the CPU determines "Yes" in step 1045, the routine proceeds to step 1050 described below and then to step 925 in FIG. 9 via step 1095.

Step 1050: The CPU rewrites the stored correction factor Cf to the calculated correction factor Cf and rewrites the wheel load, tire temperature, and tire air pressure of the wheel 11 associated with the stored correction factor Cf with the wheel load, tire temperature, and tire air pressure of the wheel 11 acquired in step 1025. That is, the CPU stores the calculated correction factor Cf in association with the selected vehicle speed range and the wheel load, tire temperature, and tire air pressure of the wheel 11 acquired in step 1025 in the storage device 30a.

In step 925, the CPU performs the process described above. The routine then proceeds to step 995 and is ended.

When none of the first to third conditions are satisfied, that is, when the CPU determines "No" in step 1045, the routine proceeds to step 1055 described below and then to step 925 in FIG. 9 via step 1095.

Step 1055: The CPU calculates the average value of the calculated correction factor Cf and the stored correction factor Cf, rewrites the stored correction factor Cf with the calculated average value, and stores the calculated average value in the storage device 30a. In step 1055, the CPU may or may not rewrite the wheel load, tire temperature, and tire air pressure of the wheel 11 associated with the stored correction factor Cf with the wheel load, tire temperature, and tire air pressure of the wheel 11 acquired in step 1025.

In step 925, the CPU performs the process described above. The routine then proceeds to step 995 and is ended.

The CPU executes a routine shown by the flowchart of FIG. 11 at predetermined time intervals. At a predetermined timing, the CPU starts the process in step 1100 of FIG. 11. The CPU then determines in step 1105 whether the vehicle 10 is traveling in a difficult-to-acquire position section.

When the vehicle 10 is not traveling in a difficult-to-acquire position section, that is, when the CPU determines "No" in step 1105, the routine proceeds to step 1110 described below. The routine then proceeds to step 1195 and is ended.

Step 1110: The CPU sets the value of "p" in the equation (13), which represents the number of the current same vehicle speed range section, to "1."

On the other hand, when the vehicle 10 is traveling in a difficult-to-acquire position section, that is, when "Yes" in step 1105, the CPU sequentially performs steps 1115 to 1125 described below. The routine then proceeds to step 1130.

Step 1115: The CPU acquires the vehicle speed and specifies the vehicle speed range including the acquired vehicle speed from the plurality of vehicle speed ranges.
Step 1120: The CPU acquires a correction factor Cfp for the specified vehicle speed range from the storage device 30a.
Step 1125: The CPU acquires the wheel load, tire temperature, and tire air pressure of the wheel 11.

In step 1130, the CPU determines whether at least one of the wheel load, tire temperature, and tire air pressure of the wheel 11 has changed to the extent that affects the tire rolling radius from the wheel load, tire temperature, and tire air pressure of the wheel 11 stored in association with the specified vehicle speed range. This determination is made as follows. When at least one of fourth to sixth conditions described below is satisfied, the CPU determines that at least one of the wheel load, tire temperature, and tire air pressure of the wheel 11 has changed to the extent that affects the tire rolling radius from the wheel load, tire temperature, and tire air pressure of the wheel 11 stored in association with the vehicle speed range. On the other hand, when none of the fourth to sixth conditions are satisfied, the CPU determines that none of the wheel load, tire temperature, and tire air pressure of the wheel 11 have changed to the extent that affects the tire rolling radius from the wheel load, tire temperature, and tire air pressure of the wheel 11 stored in association with the vehicle speed range.

Fourth condition: The absolute value of the difference between the wheel load W3 of the wheel 11 associated with the stored correction factor Cfp and the wheel load W4 of the wheel 11 acquired in step 1125 is equal to or larger than a threshold wheel load Wth2 (|W3−W4|≥Wth2).

Fifth condition: The absolute value of the difference between the tire temperature T3 associated with the stored correction factor Cfp and the tire temperature T4 acquired in step 1125 is equal to or larger than a threshold tire temperature Tth2 (|T3−T4| Tth2).

Sixth condition: The absolute value of the difference between the tire air pressure AP3 associated with the stored correction factor Cfp and the tire air pressure AP4 acquired in step 1125 is equal to or larger than a threshold tire air pressure APth2 (|AP3−AP4|≥APth2).

When at least one of the fourth to sixth conditions is satisfied, that is, when the CPU determines "Yes" in step 1130, the routine proceeds to step 1135. In step 1135, the CPU determines whether the value of "p" in the equation (13) is 2 or more.

When the value of "p" in the equation (13) is not 2 or more (i.e., when the value of "p" is "1"), that is, when "No" in step 1135, the CPU performs steps 1140 to 1155 described below. The routine then proceeds to step 1195 and is ended.

Step 1140: The CPU acquires the wheel rotation number Np from the start position of the current same vehicle speed range section from the wheel speed sensor 33 (in this example, this wheel rotation number Np is the wheel rotation number Np of the wheel 11 whose wheel rotation number Nr was acquired in step 1010). When p=1, the CPU sets the start position of the same vehicle speed range section to the position immediately before the start position of the difficult-to-acquire position section.

Step 1145: The CPU calculates the traveled distance TL from the position immediately before the start position of the difficult-to-acquire position section by using the equation (13).

Step 1150: The CPU calculates the deviation Dif from the reference position BP on the centerline CL of the lane in which the vehicle 10 is traveling.

Step 1155: The CPU estimates (specifies) the current position of the vehicle 10 based on the calculated traveled distance TL and the calculated deviation Dif. That is, the CPU specifies the reference position BP that is ahead of the position immediately before the start position of the difficult-to-acquire position section by the traveled distance TL on the centerline CL of the lane, and estimates (specifies) the position offset in the lateral direction of the lane from the specified reference position BP by the deviation Dif as the current position of the vehicle 10.

When the value of "p" in the equation (13) is 2 or more, that is, when the CPU determines "Yes" in step 1135, the routine proceeds to step 1160. In step 1160, the CPU determines whether the vehicle speed range specified in step 1115 is the same as the vehicle speed range specified in the previous routine.

When the vehicle speed range specified in step 1115 is the same as the vehicle speed range specified in the previous routine, that is, when "Yes" in step 1160, the CPU performs steps 1140 to 1155 described above. The routine then proceeds to step 1195 and is ended.

When the vehicle speed range specified in step 1115 is not the same as the vehicle speed range specified in the previous routine, that is, when "No" in step 1160, the CPU sequentially performs steps 1165 and 1170 described below. The routine then proceeds to step 1195 and is ended.

Step 1165: The CPU changes the start position of the same vehicle speed range section to the position at which the vehicle speed range changed from the vehicle speed range specified in the previous routine (that is, the position of the vehicle 10 at the time the vehicle speed range changed). The CPU also stores in the RAM the traveled distance in the same vehicle speed range section (wheel rotation number Np from the start position×2π×R0×Cfp) that will later be used in the equation (13).

Step 1170: The CPU increases the value of "p" in the equation (13) by "1."

When none of the fourth to sixth conditions are satisfied at the time the CPU performs step 1130, that is, when the CPU determines "No" in step 1130, the routine proceeds to step 1175. In step 1175, the CPU determines whether the vehicle 10 has passed the difficult-to-acquire position section.

When the vehicle 10 has not passed the difficult-to-acquire position section, that is, when "No" in step 1175, the CPU determines again whether the vehicle 10 has passed the difficult-to-acquire position section. Estimation of the position of the vehicle 10 is stopped while step 1175 is repeated.

When the vehicle 10 has passed the difficult-to-acquire position section, that is, when the CPU determines "Yes" in step 1175, the routine proceeds to step 1110 described above. The routine then proceeds to step 1195 and is ended.

The CPU executes a routine shown by the flowchart of FIG. 12 at predetermined time intervals. At a predetermined timing, the CPU starts the process in step 1200 of FIG. 12. The CPU then sequentially performs steps 1205 to 1230 described below. Thereafter, the routine proceeds to step 1295 and is ended.

Step 1205: The CPU acquires from the cloud 40 the unsprung displacements $z_1$ in a predetermined area ahead of the vehicle 10 (data that can specify the unsprung displacement $z_1$ associated with the position information, based on the position information) based on the current position of the vehicle 10 and temporarily saves the acquired unsprung displacements $z_1$ in the RAM. When the vehicle 10 is traveling in a position acquirable section, the current position of the vehicle 10 is the position acquired from the position acquisition device 37. When the vehicle 10 is traveling in a difficult-to-acquire position section, the current position of the vehicle 10 is the position estimated in step 1155 of FIG. 11.

Step 1210: The CPU specifies the speed (vehicle speed), position (current position of the vehicle 10 described above), and orientation of the vehicle 10.

Step 1215: The CPU specifies the predicted passage position of each wheel 11FL to 11RR of the vehicle 10 after the lookahead time, based on the specified speed, position, and orientation of the vehicle 10.

Step 1220: The CPU acquires the unsprung displacement $z_1$ at each specified predicted passage position from the RAM.

Step 1225: The CPU calculates the desired actuator force of each wheel actuator 17FL to 17RR based on each acquired unsprung displacement $z_1$.

Step 1230: The CPU sends a command to each wheel actuator 17FL to 17RR to output the desired actuator force. Each wheel actuator 17FL to 17RR thus outputs an actuator force corresponding to the desired actuator force at the timing a corresponding one of the wheels 11FL to 11RR passes the predicted passage position.

Effects

The position estimation device according to the embodiment of the disclosure estimates the position (self-position) of the vehicle 10 with improved accuracy.

Modification

The disclosure is not limited to the above embodiment, and various modifications can be made within the scope of the disclosure.

The predetermined distance L0 can also be given by "integral (time integral) of wheel angular velocity during traveling of the vehicle 10 in the correction factor calculation section×actual tire rolling radius." Accordingly, in the above embodiment, the ECU 30 may calculate the correction factor Cf by the equation (15) instead of the equation (12) and may calculate the traveled distance TL by the equation (16) instead of the equation (13).

$$Cf=L0/(\text{integral of wheel angular velocity during traveling of the vehicle 10 in the correction factor calculation section}\times R0) \quad (15)$$

$$TL=Ip\times R0\times Cfp+\Sigma_{k=1}^{p-1}(Ik\times R0\times Cfk) \quad (16)$$

In the equation (16), "p" represents the number of the same vehicle speed range section in which the vehicle 10 is currently traveling. The same vehicle speed range sections are numbered from "1" from the same vehicle speed range section located at the start position of the difficult-to-acquire section. The number of the same vehicle speed range section is set to an initial value ("1") when the vehicle 10 has passed the difficult-to-acquire section. The correction factor corresponding to the same vehicle speed range section numbered "m" is represented by "Cfm." The integral of the wheel angular velocity during traveling of the vehicle 10 from the start position of the same vehicle speed range section numbered "m" to the end position of this same vehicle speed range section is represented by "Im" (when m=p, "Ip" represents the integral of the wheel angular velocity during traveling from the start position of the same vehicle speed range section numbered "p" to the current position of the vehicle 10). In this example, "m" is an integer of 1 or more.

In the above embodiment, the CPU may execute a routine that is the same as the routine of FIG. 10 except that steps 1045 and 1055 are omitted and a routine that is the same as the routine of FIG. 11 except that steps 1130 and 1175 are omitted. In this modification, even when at least one of the wheel load, tire temperature, and tire air pressure of the wheel 11 has changed to the extent that affects the tire rolling radius, the correction factor stored in the storage device 30a will not be rewritten with the correction factor after this change. In this modification, however, since the correction factor Cf according to the vehicle speed range is calculated, the position of the vehicle 10 is estimated with improved accuracy as compared to the case where the correction factor Cf according to the vehicle speed range is not calculated.

In the above embodiment, the position estimation device estimates the position of the vehicle 10 to be used for the preview damping control. However, the position estimation device may estimate the position of the vehicle 10 to be used for various other controls.

In the above embodiment, white lines are detected using the camera sensor 36. However, the method for detecting white lines is not limited to this. For example, the above embodiment may include a radar sensor (e.g., LiDAR), not shown, and white lines may be detected using the radar sensor. The device that is used to detect white lines such as the camera sensor 36 and the radar sensor is also referred to as the "lane marker perception device" for convenience.

In the above embodiment, the suspensions 13FL to 13RR may be of any type as long as the suspensions 13FL to 13RR allow the wheels 11FL to 11RR and the vehicle body 10a to be displaced in the vertical direction with respect to each other, and may be independent suspensions. The suspension springs 16FL to 16RR may be of any type such as compression coil springs and air springs.

In the above embodiment, the road surface displacement-related information is the unsprung displacement $z_1$. However, the road surface displacement-related information may be the road surface displacement $z_0$. In order to more effectively damp vibration by the preview damping control, in some examples, the preview damping control is performed by using the unsprung displacement $z_1$ as the road surface displacement-related information because the unsprung displacement $z_1$ tends to be more accurate. The road surface displacement-related information may be two or more of the unsprung displacement $z_1$, the unsprung velocity $dz_1$, the road surface displacement $z_0$, and the road surface displacement velocity $dz_0$, or may be the unsprung velocity $dz_1$ or the road surface displacement velocity $dz_0$. The road surface displacement-related information may be used for the preview damping control after being processed by the ECU 30.

In the above embodiment, in the case where the difficult-to-acquire position section is also a section in which it is difficult to communicate with the cloud 40, the road surface displacement-related information of the difficult-to-acquire position section is stored in advance in the storage device 30a before the vehicle 10 travels in the difficult-to-acquire position section. The method for storing (acquiring) the road surface displacement-related information of the difficult-to-acquire position section is not limited to the example described above.

In the above embodiment, the vehicle 10 may include an autonomous driving control device having an autonomous driving control function. The autonomous driving control device is configured to generate an autonomous driving path to be taken by the vehicle 10 and perform autonomous driving control for controlling steering, braking, and driving of the vehicle 10 so that the vehicle 10 travels along the autonomous driving path.

In the above embodiment, the wheel actuators 17FL to 17RR are provided for each wheel 11. However, the wheel actuator 17 may be provided for one wheel 11 or two or more wheels 11 out of the wheels 11FL to 11RR.

In the above embodiment and the above modifications, the wheel actuator 17 is described as an example of the control force generation device. However, the control force generation device is not limited to the wheel actuator 17 as long as it can generate a vertical control force for damping vibration of the sprung portion 51.

The control force generation device may be an active stabilizer device (not shown). The active stabilizer device includes a front wheel active stabilizer and a rear wheel active stabilizer. When the front wheel active stabilizer generates a vertical control force (left front wheel control force) between the sprung portion 51 and the unsprung portion 50 corresponding to the left front wheel 11FL, the front wheel active stabilizer generates a control force (right front wheel control force) between the sprung portion 51 and the unsprung portion 50 corresponding to the right front wheel 11FR in the opposite direction to that of the left front wheel control force. Similarly, when the rear wheel active stabilizer generates a vertical control force (left rear wheel control force) between the sprung portion 51 and the unsprung portion 50 corresponding to the left rear wheel 11RL, the rear wheel active stabilizer generates a control force (right rear wheel control force) between the sprung portion 51 and the unsprung portion 50 corresponding to the right rear wheel 11RR in the opposite direction to that of the left rear wheel control force. The configuration of the active stabilizer device is well known in the art and is incorporated herein by reference to Japanese Unexamined Patent Application Publication No. 2009-96366 (JP 2009-96366 A). The active stabilizer device need only include either or both of the front wheel active stabilizer and the rear wheel active stabilizer.

The control force generation device may be a device that generates a vertical control force using the geometry of the suspensions 13FL to 13RR by increasing or decreasing the control driving force on each wheel 11 of the vehicle 10. The configuration of such a device is well known in the art and is incorporated herein by reference to Japanese Unexamined Patent Application Publication 2016-107778 (JP 2016-107778 A) etc. The ECU 30 calculates a driving control force that generates a control force corresponding to a desired control force by a well-known method.

Such a control force generation device includes a drive device (e.g., an in-wheel motor) that applies a driving force to each wheel 11 and a braking device (braking equipment) that applies a braking force to each wheel 11. The drive device may be a motor, an engine, etc. that applies a driving force to either the front wheels 11F or the rear wheels 11R or to the four wheels. The control force generation device need only include either or both of the drive device and the braking device.

The control force generation device may be adjustable shock absorbers 15FL to 15RR. In this case, the ECU 30 controls the attenuation coefficient C of the shock absorbers 15FL to 15RR so that the attenuation force changes by an amount corresponding to a desired control force.

What is claimed is:
1. A position estimation device, comprising:
a position acquisition device configured to acquire a position of a vehicle;
a vehicle information acquisition device configured to acquire a rotation parameter related to rotation of wheels of the vehicle and a vehicle speed of the vehicle;
a correction factor storage device configured to store correction factors for a reference tire rolling radius, each of the correction factors being set for a corresponding one of a plurality of vehicle speed ranges; and
a control unit configured to estimate the position of the vehicle using a traveled distance of the vehicle when the position acquisition device is not able to acquire the position of the vehicle, wherein:
the control unit is configured to, when the position acquisition device is able to acquire the position of the vehicle and the control unit determines based on the acquired position of the vehicle that the vehicle has traveled in a correction factor calculation section with a reference distance, calculate a comparative distance based on the rotation parameter during traveling of the vehicle in the correction factor calculation section, and the reference tire rolling radius, calculate a correction factor for the reference tire rolling radius based on the reference distance and the calculated comparative distance, select, from among the plurality of vehicle speed ranges, a vehicle speed range that corresponds to the vehicle speed of the vehicle during traveling of the vehicle in the correction factor calculation section, and store the calculated correction factor in association with the selected vehicle speed range in the correction factor storage device;

the control unit is configured to, when estimating the position of the vehicle using the traveled distance of the vehicle, specify, from among the plurality of vehicle speed ranges, a vehicle speed range that includes the vehicle speed of the vehicle, correct the reference tire rolling radius using the correction factor stored in association with the specified vehicle speed range in the correction factor storage device, and calculate the traveled distance of the vehicle based on the rotation parameter and the corrected reference tire rolling radius;

the control unit is configured to, when estimating the position of the vehicle using the traveled distance of the vehicle, specify as a reference position a position that is ahead of a specific position of the vehicle acquired when the position acquisition device was able to acquire the position of the vehicle by the calculated traveled distance of the vehicle, acquire a deviation in a lateral direction of a lane from the specified reference position, and estimate the position of the vehicle based on the specified reference position and the acquired deviation;

the control unit is configured in such a manner that, when the position acquisition device is able to acquire the position of the vehicle, the acquired position of the vehicle is used for preview damping control, and when the position acquisition device is not able to acquire the position of the vehicle, the estimated position of the vehicle is used for the preview damping control; and the preview damping control is control in which, based on the acquired position of the vehicle or the estimated position of the vehicle, road surface displacement-related information is acquired from a storage device located inside or outside of the vehicle and storing the road surface displacement-related information, and vibration of a sprung portion of the vehicle is damped by causing a control force generation device included in the vehicle to generate a control force specified based on the acquired road surface displacement-related information at a position of at least one of the wheels and in a vehicle body portion corresponding to the position of the one of the wheels at a timing front wheels actually pass predicted passage positions, the road surface displacement-related information being information related to a vertical displacement of a road surface at the predicted passage positions, the predicted passage positions being positions at which the front wheels included in the wheels are predicted to pass, and the control force being a control force for damping the vibration of the sprung portion.

2. The position estimation device according to claim 1, wherein:

the vehicle information acquisition device is configured to further acquire a wheel load, a tire temperature, and a tire air pressure of the wheels;

the control unit is configured to store the wheel load, the tire temperature, and the tire air pressure acquired during traveling of the vehicle in the correction factor calculation section in association with the calculated correction factor in the correction factor storage device; and the control unit is configured to, when following conditions i) and ii) are both satisfied, i) the correction factor associated with the same vehicle speed range as the vehicle speed range to be associated with the calculated correction factor has already been stored in the correction factor storage device, and ii) at least one of the wheel load, the tire temperature, and the tire air pressure to be associated with the calculated correction factor has changed by a predetermined threshold or more from the at least one of the wheel load, the tire temperature, and the tire air pressure associated with the correction factor that has already been stored in the correction factor storage device, rewrite the correction factor that has already been stored in the correction factor storage device with the calculated correction factor.

3. A position estimation method, comprising:

acquiring a position of a vehicle;

acquiring a rotation parameter related to rotation of wheels of the vehicle and a vehicle speed of the vehicle; and estimating the position of the vehicle using a traveled distance of the vehicle when the position of the vehicle is not able to be acquired, wherein:

when the position of the vehicle is able to be acquired and determination is made based on the acquired position of the vehicle that the vehicle has traveled in a correction factor calculation section with a reference distance, a comparative distance is calculated based on the rotation parameter during traveling of the vehicle in the correction factor calculation section, and a reference tire rolling radius, a correction factor for the reference tire rolling radius is calculated based on the reference distance and the calculated comparative distance, a vehicle speed range that corresponds to the vehicle speed of the vehicle during traveling of the vehicle in the correction factor calculation section is selected from among a plurality of vehicle speed ranges, and the calculated correction factor is stored in association with the selected vehicle speed range in a correction factor storage device;

when estimating the position of the vehicle using the traveled distance of the vehicle, a vehicle speed range that includes the vehicle speed of the vehicle is specified from among the plurality of vehicle speed ranges, the reference tire rolling radius is corrected using the correction factor stored in association with the specified vehicle speed range in the correction factor storage device, and the traveled distance of the vehicle is calculated based on the rotation parameter and the corrected reference tire rolling radius;

when estimating the position of the vehicle using the traveled distance of the vehicle, a position is specified as a reference position that is ahead of a specific position of the vehicle acquired when the position of the vehicle was able to be acquired by the calculated traveled distance of the vehicle, a deviation in a lateral direction of a lane from the specified reference position is acquired, and the position of the vehicle is estimated based on the specified reference position and the acquired deviation;

when the position of the vehicle is able to be acquired, the acquired position of the vehicle is used for preview damping control, and when the position of the vehicle is not able to be acquired, the estimated position of the vehicle is used for the preview damping control; and the preview damping control is control in which, based on the acquired position of the vehicle or the estimated position of the vehicle, road surface displacement-related information is acquired from a storage device located inside or outside of the vehicle and storing the road surface displacement-related information, and vibration of a sprung portion of the vehicle is damped by causing a control force generation device included in the vehicle to generate a control force specified based on the acquired road surface displacement-related information at a position of at least one of the wheels and in a vehicle body portion corresponding to the position of the one of the wheels at a timing front wheels actually pass predicted passage positions, the road surface displacement-related information being information related to a vertical displacement of a road surface at the predicted passage positions, the predicted passage positions being positions at which the front wheels included in the wheels are predicted to pass, and the control force being a control force for damping the vibration of the sprung portion.

* * * * *